United States Patent
Matheis

(10) Patent No.: US 11,000,804 B2
(45) Date of Patent: *May 11, 2021

(54) USE OF POROUS GLASS MEDIA FOR A BIOFILTER TO REMOVE ODOROUS COMPOUNDS FROM AN AIR STREAM

(71) Applicant: EVOQUA WATER TECHNOLOGIES LLC, Pittsburgh, PA (US)

(72) Inventor: Timothy Frank Matheis, Palmetto, FL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,628

(22) Filed: Jun. 10, 2020

(65) Prior Publication Data

US 2020/0368683 A1 Nov. 26, 2020

Related U.S. Application Data

(60) Continuation of application No. 16/165,045, filed on Oct. 19, 2018, now Pat. No. 10,730,013, which is a division of application No. 14/920,407, filed on Oct. 22, 2015, now Pat. No. 10,159,932, which is a continuation-in-part of application No. 14/270,461, filed on May 6, 2014, now abandoned.

(60) Provisional application No. 62/084,007, filed on Nov. 25, 2014.

(51) Int. Cl.
*B01D 53/85* (2006.01)
*B01D 53/52* (2006.01)

(52) U.S. Cl.
CPC ............ *B01D 53/85* (2013.01); *B01D 53/52* (2013.01); *B01D 2251/95* (2013.01); *B01D 2258/06* (2013.01); *Y02A 50/20* (2018.01)

(58) Field of Classification Search
CPC .... B01D 53/85; B01D 53/52; B01D 2251/95; B01D 2258/06; Y02A 50/2359
See application file for complete search history.

(56) References Cited

U.S. PATENT DOCUMENTS

| | | |
|---|---|---|
| 5,133,875 A | 7/1992 | Carnahan |
| 5,826,251 A | 10/1998 | Klendl |
| 5,831,850 A | 11/1998 | Chebre et al. |
| 5,833,766 A | 11/1998 | Osterwald et al. |
| 6,013,512 A | 1/2000 | Turschmid et al. |
| 8,772,015 B2 | 7/2014 | Husain et al. |
| 10,159,932 B2 * | 12/2018 | Matheis .......... B01D 53/52 |
| 10,730,013 B2 * | 8/2020 | Matheis .......... B01D 53/85 |
| 2001/0005525 A1 | 6/2001 | Scheutler et al. |
| 2004/0152185 A1 | 8/2004 | Egan |

(Continued)

OTHER PUBLICATIONS

Kolmert, et al. "Remediation of acidic waste waters using immobilised, acidophilic sulfate-reducing bacteria", J Chem Irechnol Biotechnol 76: 836-843; (Year: 2001).

(Continued)

*Primary Examiner* — William H. Beisner
*Assistant Examiner* — Danielle B Henkel

(57) ABSTRACT

A system for removing undesirable compounds from contaminated air includes a biofilter having porous glass media. Hydrogen sulfide is removed from contaminated air by passing the contaminated air through the biofilter.

20 Claims, 22 Drawing Sheets

(56) References Cited

U.S. PATENT DOCUMENTS

| | | |
|---|---|---|
| 2006/0027099 A1 | 2/2006 | Kim |
| 2007/0084795 A1 | 4/2007 | Jordan |
| 2007/0180802 A1 | 8/2007 | Parker et al. |
| 2008/0085547 A1 | 4/2008 | Herner |
| 2008/0096268 A1 | 4/2008 | Herner |
| 2008/0308493 A1 | 12/2008 | Amir et al. |
| 2009/0090240 A1 | 4/2009 | Husain |
| 2009/0093042 A1 | 4/2009 | Husain |
| 2010/0129895 A1 | 5/2010 | Crawford |
| 2013/0318935 A1 | 12/2013 | Mallinen |

OTHER PUBLICATIONS

Sloan, Jeff, "CAMX 2015 preview: Poraver North America", The Composites and Advanced Materials Expo, (Year: 2015).
Kaehler, steven "Fuzzy Logic—An Inlroduction" http://www.seattlerobotics.org/encoder/dec97/fuzzy.html, 1998.
Internet Archive WaybackMachine http:l//web.archive.org/web/20000601000000*/http://www.seattlerobotics.org/encoder/dec97/fuzzy.html, 1998.

\* cited by examiner

USE OF POROUS GLASS MEDIA FOR A BIOFILTER TO REMOVE ODOROUS COMPOUNDS FROM AN AIR STREAM

CROSS-REFERENCE TO RELATED APPLICATIONS

This application claims priority under 35 U.S.C. § 120 as a continuation of U.S. patent application Ser. No. 16/165,045 filed Oct. 19, 2018, titled USE OF POROUS GLASS MEDIA FOR A BIOFILTER TO REMOVE ODOROUS COMPOUNDS FROM AN AIR STREAM, now U.S. Pat. No. 10,730,013, issued Aug. 4, 2020; which is a division of U.S. application Ser. No. 14/920,407, filed Oct. 22, 2015, titled USE OF POROUS GLASS MEDIA FOR A BIOFILTER TO REMOVE ODOROUS COMPOUNDS FROM AN AIR STREAM, now U.S. Pat. No. 10,159,932, issued Dec. 25, 2018, which claims the benefit of U.S. Provisional Application Ser. No. 62/084,007, filed Nov. 26, 2014, and which is a continuation-in-part of U.S. application Ser. No. 14/270,461, filed May 6, 2014, titled USE OF FOAMED GLASS AS MEDIA FOR A BIOFILTER TO REMOVE ODOROUS COMPOUNDS FROM AN AIR STREAM, the content of each being incorporated herein by reference for all purposes.

BACKGROUND

Field of Invention

Aspects and embodiments of the present invention are directed to treatment of air streams, and more particularly, to systems and methods for removing odor causing compounds from an air stream.

Discussion of Related Art

Sewage systems typically include conduits that collect and direct sewage and other waste streams, such as industrial effluents, to a treatment facility. Such systems typically include various pumping facilities, such as lift stations, that facilitate the transfer of wastewater to such treatment facilities. During transit odorous species are often generated. Such odorous species may be objectionable when released or discharged. Untreated sewage may generate multiple odor-causing compounds. One of the most prevalent and most distinctive compounds formed is hydrogen sulfide ($H_2S$).

Hydrogen sulfide may be formed in wastewater streams by the conversion of sulfates to sulfides by sulfide reducing bacteria (SRBs) under anaerobic conditions. Hydrogen sulfide is dissolvable in water (up to about 0.4 g/100 ml at 20 degrees Celsius and 1 atmosphere of pressure). In water, hydrogen sulfide exists in equilibrium with the bisulfide ion $HS^-$ and the sulfide ion $S^{2-}$. Unlike sulfide and bisulfide, hydrogen sulfide is volatile, with a vapor pressure of about $1.56 \times 10^4$ mm Hg (2.1 MPa) at 25 degrees Celsius, and may emerge from aqueous solution to form gaseous hydrogen sulfide. The presence of hydrogen sulfide in sewer systems is undesirable due to its offensive odor, toxicity, and corrosivity.

Gaseous hydrogen sulfide exhibits a characteristic unpleasant odor suggestive of rotten eggs. Humans can detect this odor at hydrogen sulfide concentrations as low as four parts per billion (ppb). Hydrogen sulfide is considered toxic. The United States Occupational Safety and Health Administration (OSHA) has established a permissible exposure limit to hydrogen sulfide (8 hour time-weighted average) of 10 ppm. Extended exposure to a few hundred ppm can cause unconsciousness and death. Accordingly, the presence of hydrogen sulfide in sewer systems is found objectionable to people who may come into contact with the gaseous effluent from such sewer systems.

Hydrogen sulfide also supports the growth of organisms such as *thiothrix* and *beggiatoa*. These are filamentous organisms which are associated with bulking problems in activated sludge treatment systems.

SUMMARY

In accordance with an aspect of the present invention, there is provided a gas phase biofilter for the treatment of contaminated air. The biofilter comprises a contaminated air inlet, a treated air outlet, and a media bed including foamed glass media in fluid communication between the contaminated air inlet and the treated air outlet.

In some embodiments, the foamed glass media comprises silicon dioxide. The foamed glass media may include surface pores. The foamed glass media may include internal voids. Individual pieces of the foamed glass media may include passageways extending from first surfaces of the individual pieces to second surfaces of the individual pieces. The foamed glass media may comprise recycled glass.

In some embodiments, the biofilter further comprises a population of hydrogen sulfide oxidizing bacteria disposed on and/or in the foamed glass media.

In some embodiments, the biofilter is operable to reduce a concentration of hydrogen sulfide in contaminated air by more than about 95% when the contaminated air is passed through the media bed of the biofilter at a flow rate of from zero to 500 cubic meters per hour per cubic meter of media bed volume.

In some embodiments, the biofilter is operable to reduce the concentration of hydrogen sulfide in the contaminated air by more than about 95% when the contaminated air is passed through the media bed of the biofilter at a flow rate of greater than about 500 cubic meters per hour per cubic meter of media bed volume.

In some embodiments, the biofilter is operable to reduce the concentration of hydrogen sulfide in the contaminated air by more than about 99% when the contaminated air is passed through the media bed of the biofilter at a flow rate of from zero to 500 cubic meters per hour per cubic meter of media bed volume.

In some embodiments, the biofilter is operable to reduce the concentration of hydrogen sulfide in the contaminated air by more than about 99% when the contaminated air is passed through the media bed of the biofilter at a flow rate of greater than about 500 cubic meters per hour per cubic meter of media bed volume.

In accordance with another aspect, there is provided a method of removing an undesirable compound from contaminated air. The method comprises flowing the contaminated air through a gas phase biofilter including a foamed glass media.

In some embodiments, the method further comprises filling a media bed compartment of the biofilter at least partially with the foamed glass media prior to flowing the contaminated air through the biofilter.

In some embodiments, the method further comprises growing a population of hydrogen sulfide oxidizing bacteria on the foamed glass media. The method may further comprise maintaining the population of hydrogen sulfide oxidizing bacteria on the foamed glass media.

In some embodiments, the method further comprises measuring a one of a concentration of nutrient in a fluid within and exiting the biofilter and adjusting an amount of nutrient added to the media bed compartment per unit of time responsive to the concentration of the nutrient in the fluid being outside of a predetermined range.

In some embodiments, removing the undesirable compound from the contaminated air comprises removing hydrogen sulfide from the contaminated air. Removing the hydrogen sulfide from the contaminated air may comprise reducing a concentration of hydrogen sulfide in the contaminated air by more than about 95% by passing the contaminated air at a flow rate of from about zero to about 250 cubic meters per hour per cubic meter of a media bed of the biofilter including the foamed glass media through the media bed. Reducing the concentration of hydrogen sulfide in the contaminated air may comprise reducing the concentration of hydrogen sulfide in the contaminated air by more than about 99%. Removing the hydrogen sulfide from the contaminated air may comprises reducing a concentration of hydrogen sulfide in the contaminated air by more than about 95% or by more than about 99% by passing the contaminated air at a flow rate of greater than about 500 cubic meters per hour per cubic meter of the media bed through the media bed.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
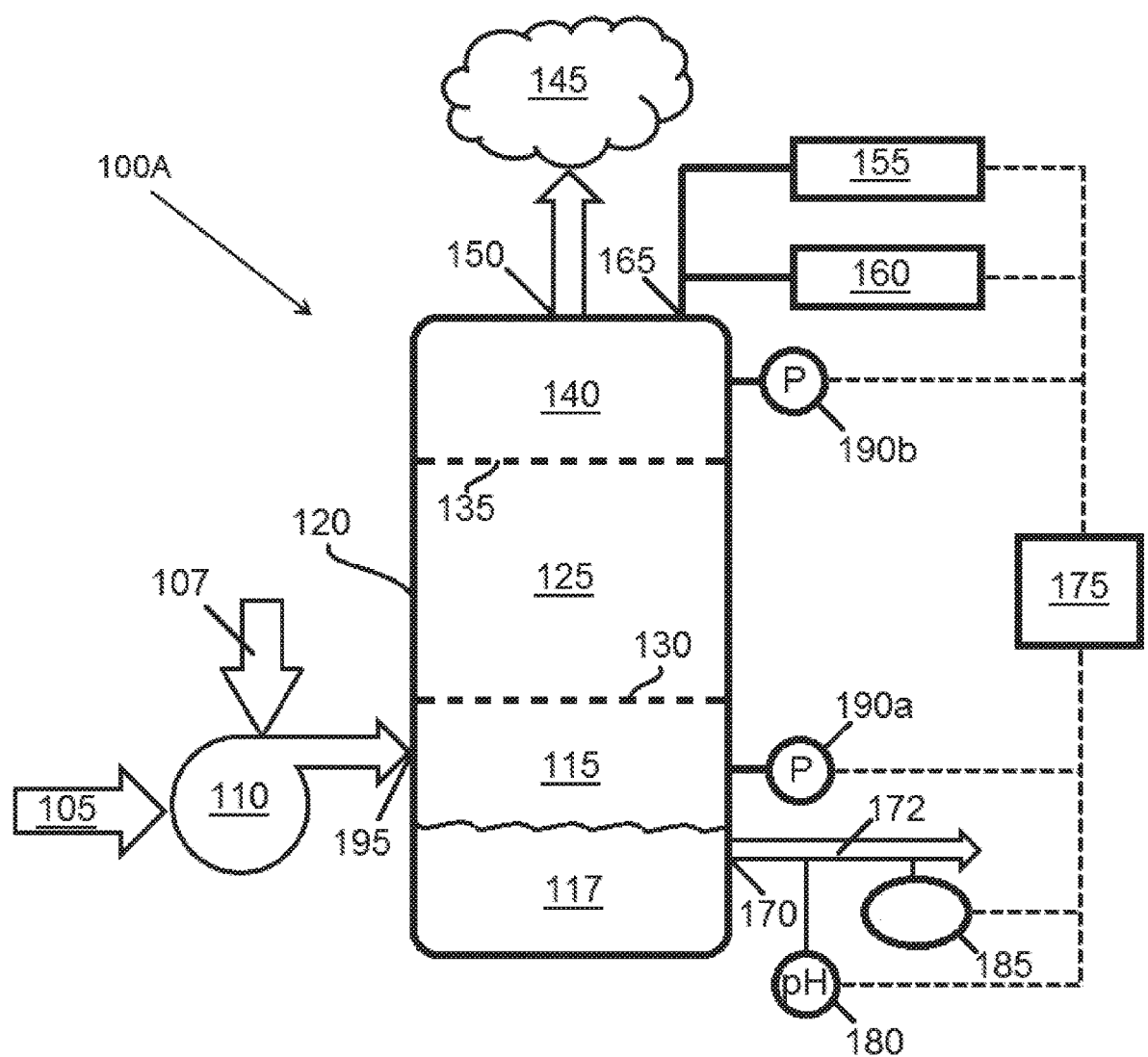
FIG. 1A is a schematic diagram of a biofilter for treating a contaminated air stream.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

It is generally desirable to remove hydrogen sulfide from air streams (referred to herein as "foul air") from sewage systems, manhole headspaces, wastewater treatment systems, and/or other systems in which hydrogen sulfide may be generated. Aspects and embodiments disclosed herein include systems and methods for removing hydrogen sulfide from contaminated air streams. Aspects and embodiments disclosed herein may also be utilized to remove other objectionable and/or odor causing compounds from contaminated air streams, for example, compounds resulting from the volatilization of reduced sulfur compounds in a sewage or wastewater stream such as any one or more of carbon disulfide, dimethyl sulfide, dimethyl disulfide, dimethyl trisulfide, methyl mercaptans, ethyl mercaptans, butyl mercaptans, allyl mercaptans, propyl mercaptans, crotyl mercaptans, benzyl mercaptans, thiophenol, sulfur dioxide, and carbon oxysulfide, or hydrogen sulfide generated from any of these compounds by sulfate reducing bacteria. For the sake of simplicity, however, aspects and embodiments disclosed herein will be described as removing hydrogen sulfide from contaminated gas streams.

Aspects and embodiments disclosed herein may remove hydrogen sulfide from contaminated gas stream by the biological conversion of the hydrogen sulfide into less objectionable or less odorous compounds. In some embodiments, hydrogen sulfide oxidizing bacteria, for example, one or more of *ancalochloris beggiatoa, beggiatoa alba, sulfobacillus, thiobacillus denitrificans, thiohalocapsa halophila, thiomargarita*, or *thioploca* oxidize hydrogen sulfide ($H_2S$) into sulfuric acid ($H_2SO_4$). In some embodiments, the hydrogen sulfide oxidizing bacteria (referred to hereinafter as simply "bacteria"), are present on a media material disposed in a biofilter. The bacteria may form a biofilm on surfaces of the media material. Contaminated air passed through the biofilter contacts the bacteria contained therein and the bacteria remove hydrogen sulfide from the contaminated air by oxidizing the hydrogen sulfide into sulfuric acid. In some embodiments, the biofilter is supplied with water and various nutrients, for example, nitrate, potassium, and phosphate compounds, to provide an environment within the biofilter conducive for the maintenance and/or growth of desirable bacteria populations. The supply of water and nutrients to the biofilter is, in some embodiments, controlled in response to the results of measurements of parameters including, for example, pH and nutrient concentration of liquid within various portions of the biofilter and/or of waste liquid drained from the biofilter.

In new installations, bacteria may migrate into a new biofilter along with water vapor from an environment in which the new biofilter is installed to establish a bacterial population effective for the removal of odorous compounds from contaminated air from the environment. The establishment of a sufficiently large bacterial population within the biofilter (referred to herein as "acclimation" of the biofilter) may take between about a few days and about a week. In some implementations, a biofilter may be "seeded" with desirable bacteria to shorten the time period required for the biofilter to acclimate.

FIG. 1A illustrates one embodiment of a biofilter, indicated generally at 100A, for the treatment of contaminated air. The biofilter 100A is supplied with contaminated air 105, for example, air from the headspace of a sewage system or a wastewater treatment system. The contaminated air 105 contains odorous compounds including, for example, hydrogen sulfide. The contaminated air 105 is blown through a blower 110 and through an air inlet 195 into a lower plenum 115 of a biofilter vessel 120. In some embodiments, dilution air 107 may be provided to the biofilter vessel 120 in addition to the contaminated air 105. The dilution air 107 may be supplied through the same blower 110 as the contaminated air 105 or a different blower. Dilution air 107 may be useful in instances in which a concentration of hydrogen sulfide in the contaminated air 105 exhibits a spike or otherwise exceeds a design concentration for the biofilter 100A. Alternatively or additionally, the contaminated air 105, along with any dilution air 107, may be pulled through the biofilter vessel 120 by a fan or blower located at an outlet 150 of the biofilter vessel 120.

The contaminated air passes through the lower plenum 115 and into a media bed compartment 125 of the biofilter 100A. The media bed compartment 125 includes media, for example, particulate media, on which bacteria and/or other microorganisms reside. The media is retained in the media bed compartment 125 by a lower screen 130 and an upper screen 135. In some embodiments, the upper screen 135 is omitted. The contaminated air passing through the media bed compartment 125 contacts the media and the bacteria and/or other microorganisms on the media in the media bed compartment 125. The bacteria and/or other microorganisms in the media bed compartment 125 consume hydrogen sulfide in the contaminated air, removing the hydrogen sulfide from the contaminated air and converting the contaminated air into treated air. The treated air passes through an upper plenum 140 of the biofilter 100A and is released to the external environment 145 or a polishing unit through the upper gas outlet 150 of the biofilter vessel 120. In some embodiments, a biofilter may include multiple media compartments 125, for example, two media bed compartments, a second media bed compartment disposed above a first media bed compartment and separated from the first media bed compartment by appropriate screens or other separators.

Sulfuric acid and/or other acids produced by the bacteria and/or other microorganisms, water, unutilized nutrients, and other waste fluids exit the biofilter vessel 120 through a drain outlet 170 and drain line 172. These waste fluids may be returned to a sewage system or wastewater treatment system from which the contaminated air was withdrawn or may be otherwise treated, for example, to neutralize the acid in the waste fluids, or disposed of.

A lower portion of the plenum 115 may function as a sump which may retain fluid 117 draining from the media bed compartment 125. The fluid 117 may exit the biofilter vessel 120 once the level of the fluid 117 reaches the level of the drain outlet 170.

To provide an environment conducive to the maintenance and/or growth of a desirable bacterial/microbial population within the biofilter 100A, water from a source of water 155 and/or nutrients, for example, nitrate, potassium, and/or phosphate compounds from a source of nutrients 160 is introduced into the biofilter vessel 120 through an inlet 165 of the biofilter vessel 120. In some embodiments, the nutrients are supplied as an aqueous solution.

The source of water 155 and the source of nutrients 160 are illustrated in FIG. 1 as being in fluid communication with the same inlet 165 of the biofilter vessel 120, but in other embodiments may be fluidly connected to different inlets of the biofilter vessel 120. Upon entering the biofilter vessel 120, the water and/or nutrients are distributed over the top of the media bed in the media bed compartment 125 by, for example, a fluid distributor, sprayer, or sprinkler (not shown). In embodiments including multiple media beds, separate fluid distributors may be utilized to distribute water and/or nutrients over the respective tops of the multiple media beds. The water and/or nutrients are periodically provided to the media bed in the media bed compartment 125. In some embodiments, the water and/or nutrients are introduced into the media bed in a timed interval. The timed interval and/or flow rate of water and/or nutrients into the media bed may vary in different embodiments, and/or responsive to operating conditions of the biofilter 100A as discussed below.

In some embodiments, the biofilter 100A is provided with one or more sensors which provide information to a controller 175. The controller 175 analyzes the information from the one or more sensors and adjusts a timing/and or rate of introduction of water and/or nutrients from the source of water 155 and/or source of nutrients 160, respectively, into the biofilter vessel 120 responsive to an analysis of the information. In some embodiments, the controller 175 may also control a speed of the blower 110 and/or a ratio of contaminated air 105 to dilution air 107 introduced into the biofilter responsive to an analysis of information provided from one or more sensors associated with the biofilter 100A, for example, a sensor providing information regarding a concentration of $H_2S$ exiting the biofilter 100A or a percent of $H_2S$ removed from contaminated air by the biofilter. In some embodiments, the biofilter 100A includes a pH sensor 180 and a nutrient concentration sensor 185 configured to measure the pH and a concentration of one or more components of a nutrient supplied to the biofilter 110A, respectively, in fluid within and/or drained from the biofilter vessel 120 through the drain line 172. The sensors 180, 185 are illustrated as coupled to the drain line 172 in FIG. 1A, but in other embodiments may be configured to measure parameters of fluid within the media bed 125, lower plenum 115, or other portions of the biofilter 100A.

The nutrient concentration measured by a nutrient sensor 185 is utilized by the controller 175 to control a flow rate and/or frequency of the flow of nutrients from the source of nutrients 160 into the biofilter vessel 120. A nutrient concentration or a concentration of a component of nutrient supplied to the biofilter 100A below a lower threshold within the biofilter vessel 120 and/or exiting the drain 170 of the biofilter vessel 120 may be indicative of insufficient nutrients being supplied to the bacteria. A nutrient concentration or a concentration of a component of nutrient supplied to the biofilter 100A above an upper threshold in fluid within the biofilter vessel 120 and/or exiting the drain 170 of the biofilter vessel 120 may be indicative of an excessive amount of nutrients being supplied to the bacteria. If the nutrient concentration in fluid within the biofilter vessel 120 and/or exiting the drain 170 of the biofilter vessel 120 is less than the lower threshold, the flow rate and/or frequency of the flow of nutrients from the source of nutrients 160 into the biofilter vessel 120 is increased. If the nutrient concentration in fluid within the biofilter vessel 120 and/or exiting the drain 170 of the biofilter vessel 120 is above the upper threshold, the flow rate and/or frequency of the flow of nutrients from the source of nutrients 160 into the biofilter vessel 120 is decreased. In some embodiments, a nutrient concentration of, for example, nitrate nitrogen ($NO_3$—N), of between about 5 mg/L and about 10 mg/L in the sump of the biofilter or exiting the drain 170 of the biofilter vessel 120 may be desirable.

In other embodiments, pH and nutrient concentration measurements are manually taken from liquid 117 in the sump of the biofilter vessel and the timing, rate, and/or volume of introduction of water and/or nutrients from the source of water 155 and/or source of nutrients 160, respectively are manually adjusted.

Pressure sensors 190a, 190b provide an indication of the differential pressure across the biofilter vessel 120 and/or media bed compartment 125. A pressure differential exceeding an upper threshold value, for example, between about two inches (5.1 cm) and about 10 inches (25 cm) of water (four degrees Celsius) (between about 498 Pascal and about 2,491 Pascal) or about 4 inches (10.2 cm, about 997 Pascal) of water may be indicative of the biofilter vessel 120 and/or media bed compartment 125 being blocked, for example, by contaminants or by over-packing of media in the media bed compartment 125. Responsive to the detection of a pressure differential exceeding an upper threshold, the controller 175 may increase the speed of the blower 110 to maintain an air flow through the biofilter vessel 120 within a desired range and/or may shut down the biofilter 100A and/or provide an indication to an operator that the biofilter 100A may be in need of service. A pressure differential which decreases over time may be indicative of the biofilter vessel 120 and/or media bed compartment 125 exhibiting channeling, for example, due to channels forming through the media bed and/or by poor distribution or mis-packing of media in the media bed compartment 125. Responsive to the detection of a drop in the pressure differential, the controller 175 may shut down the biofilter 100A and/or provide an indication to an operator that the biofilter 100A may be in need of service.

Figure 1B:
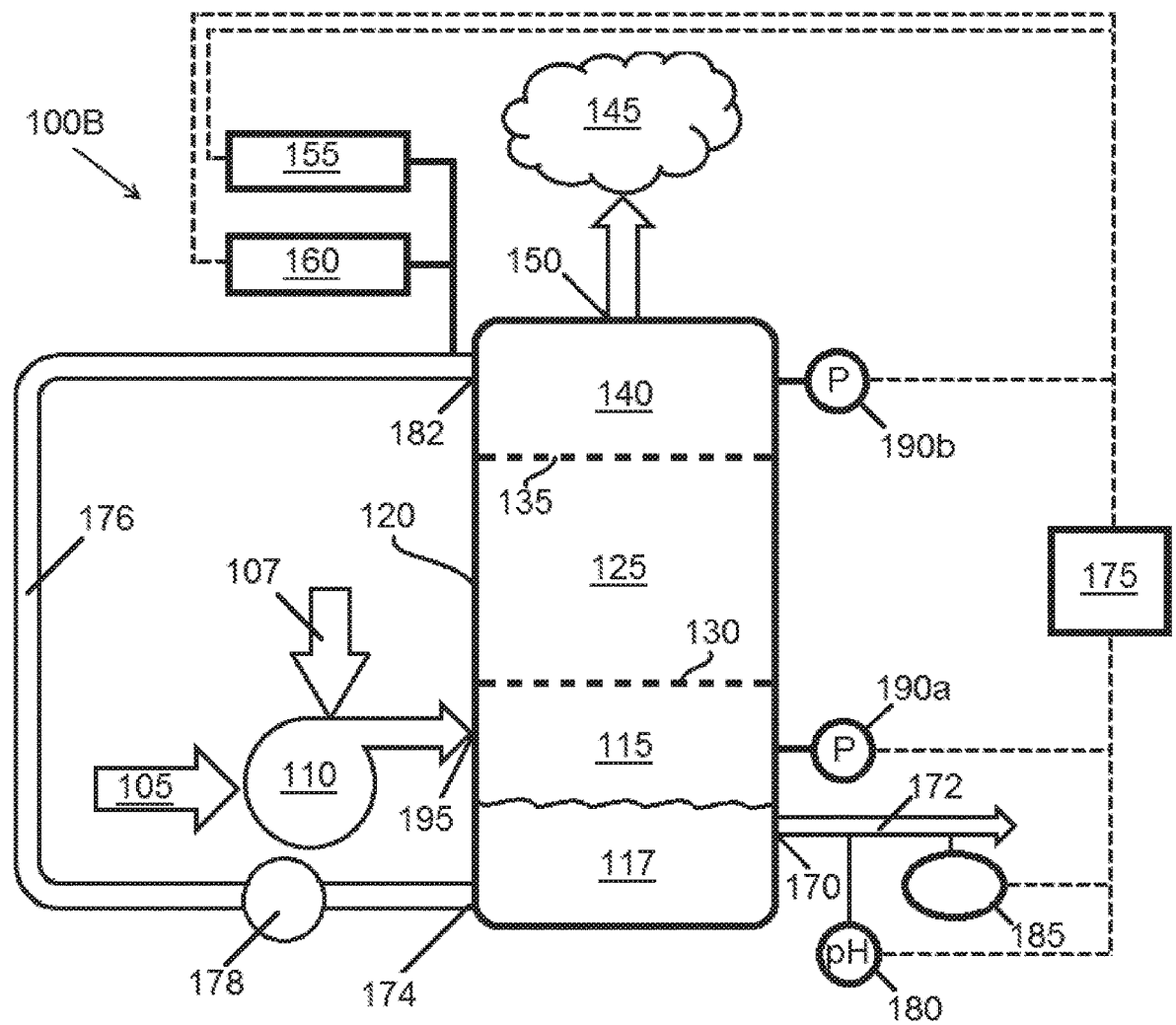
FIG. 1B is a schematic diagram of another biofilter for treating a contaminated air stream.

In some embodiments, as illustrated in the biofilter generally indicated at 100B in FIG. 1B, which is substantially the same as biofilter 100A, a portion of the fluid 117 in the sump of the biofilter vessel 120 may be recycled, for example, from lower fluid outlet 174 through recycle line 176 and pump 178 into an inlet 182 proximate an upper end of the biofilter vessel 120. Residual nutrients remaining in the fluid exiting the media bed 125 are thus re-introduced into the biofilter vessel 120, retaining the bioculture and reducing the need for "fresh" nutrients to be introduced into the biofilter vessel 120 from the source of nutrients 160, reducing operating costs of the biofilter 100B. Acid in the fluid exiting the media bed 125 is also re-introduced into the biofilter vessel 120, which may facilitate maintaining the pH within the media bed 125 and/or biofilter vessel 120 at a desired level. Water and/or nutrients from the source of water 155 and/or source of nutrients 160, respectively, may be introduced into the biofilter vessel 120 through the same inlet 182 as the recycled liquid 117 and may be distributed onto the top of the media bed compartment 125 utilizing a common fluid distributor, sprayer, or sprinkler as the recycled liquid 117. Biofilters configured as illustrated in FIG. 1B may be referred to as trickling biofilters. The following discussion applies equally to the both biofilters 100A and 100B.

The controller 175 used for monitoring and controlling operation of the biofilter 100A, 100B may include a computerized control system. Various aspects of the invention may be implemented as specialized software executing in a general-purpose computer system 200 such as that shown in FIG. 2. The computer system 200 may include a processor 202 connected to one or more memory devices 204, such as a disk drive, solid state memory, or other device for storing data. Memory 204 is typically used for storing programs and data during operation of the computer system 200. Components of computer system 200 may be coupled by an interconnection mechanism 206, which may include one or more busses (e.g., between components that are integrated within a same machine) and/or a network (e.g., between components that reside on separate discrete machines). The interconnection mechanism 206 enables communications (e.g., data, instructions) to be exchanged between system components of system 200. Computer system 200 also includes one or more input devices 208, for example, a keyboard, mouse, trackball, microphone, touch screen, and one or more output devices 210, for example, a printing device, display screen, and/or speaker. The output devices 210 may also comprise valves, pumps, or switches which may be utilized to introduce water and/or nutrients from the source of water 155 and/or the source of nutrients 160 into the biofilter and/or to control the speed of a blower of the biofilter. One or more sensors 214 may also provide input to the computer system 200. These sensors may include, for example, nutrient sensor 185, pressure sensors 190a, 190b, sensors for measuring a concentration of an undesirable component of contaminated air, for example, $H_2S$, and/or other sensors useful in a biofilter system. These sensors may be located in any portion of a biofilter system where they would be useful, for example, upstream of a media bed, downstream of a media bed, in communication with a liquid waste outlet of a biofilter vessel, and/or in communication with an air or gas outlet of a biofilter vessel. In addition, computer system 200 may contain one or more interfaces (not shown) that connect computer system 200 to a communication network in addition or as an alternative to the interconnection mechanism 206.

Figure 3:
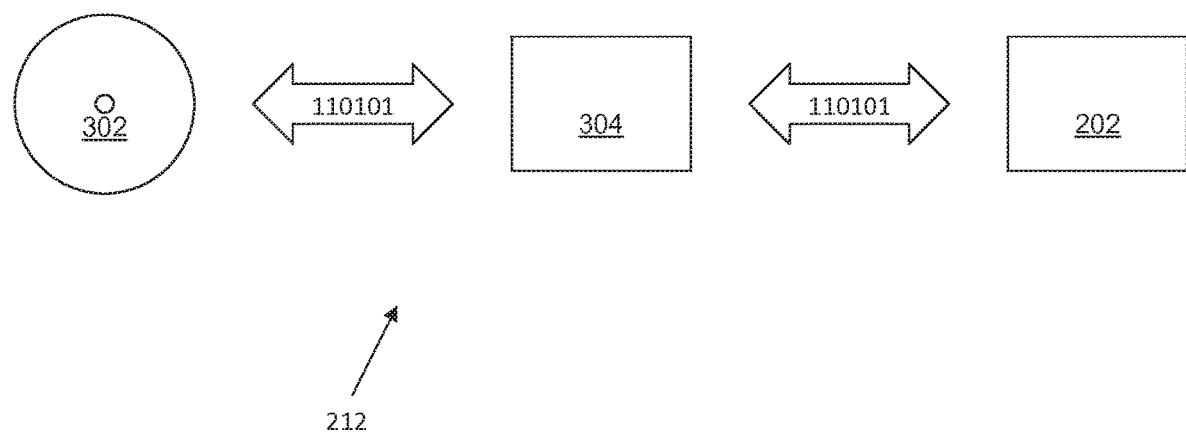
FIG. 3 is a block diagram of a memory system of the computer system of FIG. 2.

The storage system 212, shown in greater detail in FIG. 3, typically includes a computer readable and writeable non-volatile recording medium 302 in which signals are stored that define a program to be executed by the processor or information to be processed by the program. The medium may include, for example, a disk or flash memory. Typically, in operation, the processor causes data to be read from the nonvolatile recording medium 302 into another memory 304 that allows for faster access to the information by the processor than does the medium 302. This memory 304 is typically a volatile, random access memory such as a dynamic random access memory (DRAM) or static memory (SRAM). It may be located in storage system 212, as shown, or in memory system 204. The processor 202 generally manipulates the data within the integrated circuit memory 204, 304 and then copies the data to the medium 302 after processing is completed. A variety of mechanisms are known for managing data movement between the medium 302 and the integrated circuit memory element 204, 304, and the invention is not limited thereto. The invention is not limited to a particular memory system 204 or storage system 212.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Figure 2:
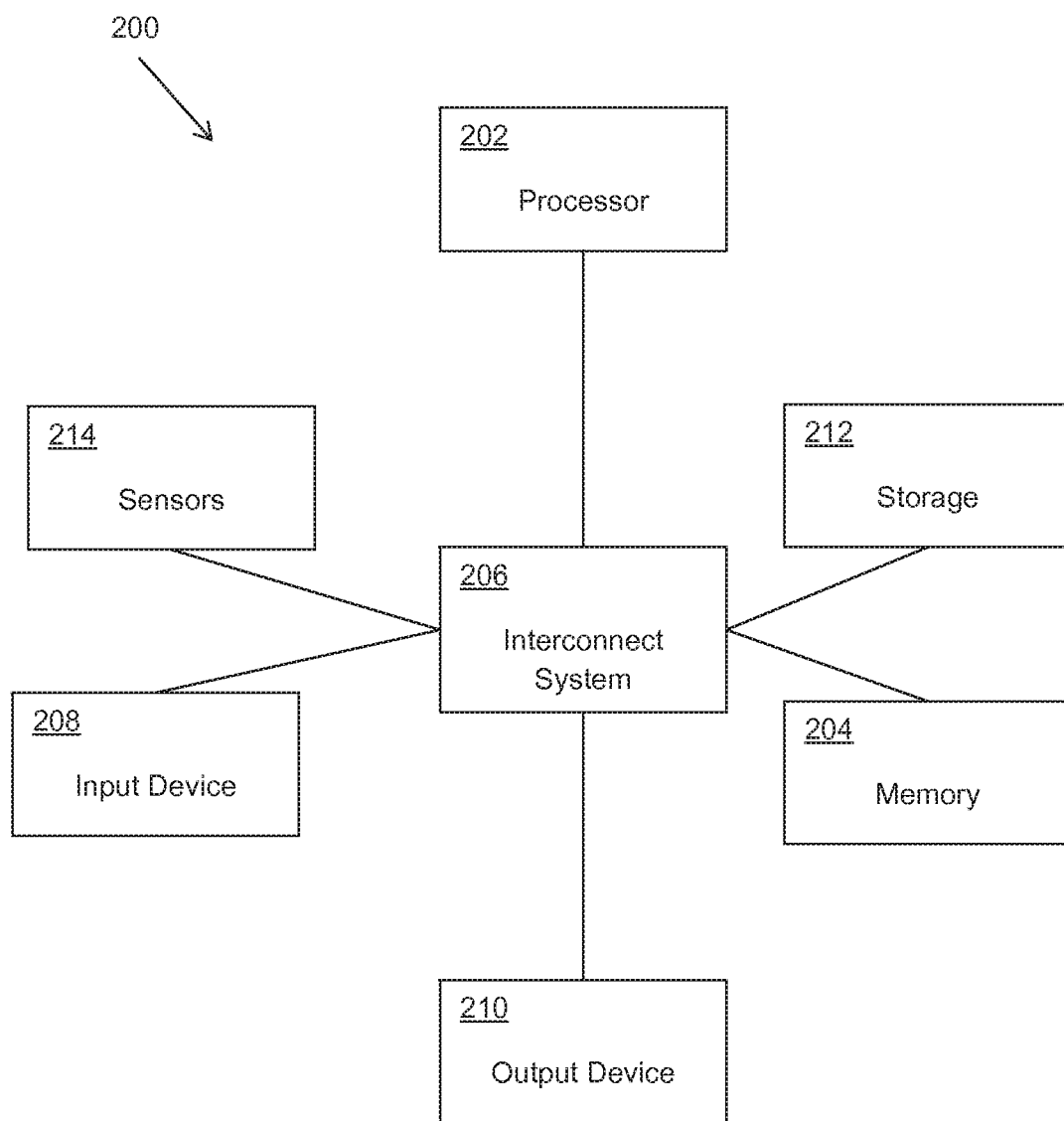
FIG. 2 is a block diagram of a computer system upon which embodiments of a method for treating a contaminated air stream may be performed.

Although computer system 200 is shown by way of example as one type of computer system upon which various aspects of the invention may be practiced, it should be appreciated that aspects of the invention are not limited to being implemented on the computer system as shown in FIG. 2. Various aspects of the invention may be practiced on one or more computers having a different architecture or components that that shown in FIG. 2.

Computer system 200 may be a general-purpose computer system that is programmable using a high-level computer programming language. Computer system 200 may be also implemented using specially programmed, special purpose hardware. In computer system 200, processor 202 is typically a commercially available processor such as the well-known Pentium™ or Core™ class processors available from the Intel Corporation. Many other processors are available. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C # (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

The materials of construction of the biofilter vessel 120 are desirably resistant to attack by acid which is generated by the bacteria in the biofilter vessel 120. The walls of the biofilter vessel 120 and the upper and lower screens 130, 135 may be formed from, for example, fiberglass and/or an acid resistant polymer and/or may be coated with an acid resistant material.

Media used in the media bed compartment 125 of the biofilter vessel 120 may be composed of various organic and/or inorganic materials, including, for example, wood mulch, pine bark, gravel, pumice, expanded shale, fired clay, and polymeric open celled foam (referred to hereinafter as "traditional media materials"). It has been discovered that media formed from these traditional media materials exhibits various undesirable properties. For example, traditional media materials typically degrade over time due to exposure to the acid environment in a biofilter vessel. Traditional media materials typically have useful lifetimes of between about one and about five years, after which they must be replaced. If not replaced, traditional media materials such as wood mulch or pine bark may break down and form a sludge-like material, and gravel, pumice, shale, or fired clay may break down into sand-like or clay-like particles. The sludge-like material or sand-like or clay-like particles may impede or block flow of contaminated air through the biofilter vessel. Traditional media materials typically are undesirably dense, rending handling difficult. Further, traditional media materials often exhibit less than a desired odor removal efficiency due to, for example, limited surface area upon which bacteria may grow. This low efficiency may require biofilters utilizing traditional media materials to have a larger media bed, and thus a larger overall size than desired. Space is often at a premium in systems such as sewage lift stations and thus, it is desirable to provide biofilters having smaller rather than larger physical sizes for use in such systems.

Media used in the media bed compartment of biofilters as disclosed herein may have certain desirable properties. For example, media for use in the media bed compartment of biofilters as disclosed herein desirably has a large surface area upon which hydrogen sulfide oxidizing bacteria may reside. The media also is desirably resistant to decomposition or damage by the hydrogen sulfide oxidizing bacteria, by hydrogen sulfide or other compounds present in the foul air treated by the biofilter, and by sulfuric acid generated by decomposition of hydrogen sulfide by the hydrogen sulfide oxidizing bacteria. The media desirably exhibits high retention of water, providing conditions that facilitate growth of microorganisms. The media desirably exhibits high crushing force, allowing for it to be stacked in beds several feet thick without being compromised and broken. The media desirably exhibits a low resistance to airflow such that very little drop in pressure occurs through the bed volume.

It has been discovered that sintered glass ($SiO_2$) media may be utilized in place of traditional media materials in biofilters for the removal of odorous compounds, for example, hydrogen sulfide, from contaminated air. The sintered glass media is formed from small glass beads, which in some embodiments have diameters similar to that of fine sand, for example, in a range of from about 8 μm to about 2,500 μm, in other embodiments, from about 25 μm to about 1,000 μm, and in other embodiments, diameters in a range of from about 50 μm to about 250 μm. The glass beads are packed into a mold and heated to the point at which portions of the surfaces of the individual glass beads partially melt and become adhered to one another. The resulting sintered glass media includes a large number of voids and a low packing factor (the fraction of the volume of glass compared to the volume of the sintered glass (glass plus void space in the piece of media material)), for example, in some embodiments, a packing factor of between about 0.25 and about 0.9 and in other embodiments a packing factor of between about 0.5 and about 0.8. In some embodiments, the resulting sintered glass media includes pores with characteristic dimensions (for example, diameters) of between about 1 μm and about 250 μm, and in other embodiments, between about 10 μm and about 100 μm.

The large number of voids, pores, and low packing density of the sintered glass media provides the media with a large surface area on which bacteria may grow. The large surface area of the sintered glass media as compared to traditional media materials provides for the sintered glass media to operate with greater odor removal efficiency in a biofilter than media formed of traditional media materials. The increased odor removal efficiency of the sintered glass media may allow for a biofilter utilizing sintered glass media to be sized smaller than a biofilter utilizing traditional media materials while achieving equivalent odor removal performance, or alternatively, to achieve greater odor removal performance than an equivalently sized biofilter utilizing traditional media material.

In some embodiments, a biofilter utilizing sintered glass media for the gas phase removal of hydrogen sulfide from contaminated air is operable to remove greater than about 95%, and in some instances greater than about 98% or greater than about 99%, of hydrogen sulfide from contaminated air including greater than about 50 ppm, and in some instances greater than about 100 ppm, of hydrogen sulfide from the contaminated air when passed through a media bed having a volume of about one cubic meter at a rate of greater than about 250 cubic meters per hour, and in some instances at a rate of greater than about 500 cubic meters per hour. A biofilter utilizing sintered glass media for the gas phase removal of hydrogen sulfide from contaminated air may also be operable to remove hydrogen sulfide from contaminated air at substantially the same efficiencies when the contaminated air includes concentrations of hydrogen sulfide less than 50 ppm, for example, between about 0 ppm and about 50 ppm or between about 10 ppm and about 40 ppm.

Sintered glass media has a low bulk density, for example, between about 300 g/L and about 1,000 g/L in some embodiments and between about 500 g/L and about 800 g/L in other embodiments. The low density of the sintered glass media makes handling of the sintered glass media less difficult than the handling of some traditional media materials. Further, the sintered glass media is non-reactive with and not attacked by sulfuric acid, and thus may exhibit a greater lifetime than traditional media materials. Theoretically, sintered glass media may have an indefinite lifetime in a biofilter and may not need to be periodically replaced due to breakdown caused by contact with sulfuric acid in the biofilter.

Figure 4A:
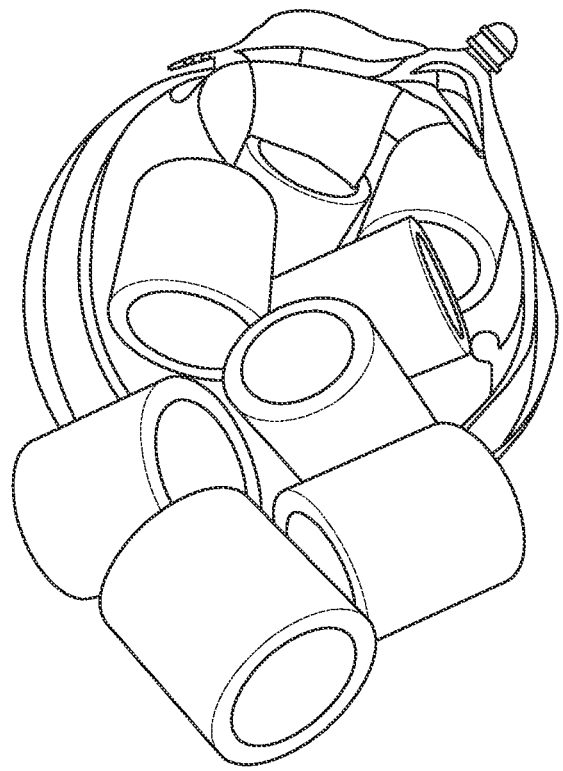
FIG. 4A is an image of an embodiment of a sintered glass biofilter media.

Sintered glass media for use in a biofilter may be formed in numerous shapes. In one embodiment, as illustrated in FIG. 4A, the sintered glass media is formed into hollow cylinders. In one exemplary embodiment, the sintered glass cylinders have an outside diameter of approximately 15 mm, an inside diameter of approximately 10 mm, and a length of approximately 15 mm. In another exemplary embodiment, illustrated in FIG. 4B, the sintered glass media is formed into "gears" or a "gear-like" shape including a hollow and roughly cylindrical body approximately 20 mm long with an outside diameter of approximately 26 mm and inside diameter of approximately 10 mm with cogs along both inner and outer walls. The outer cogs are about 5 mm by 5 mm placed about 2 mm apart for a total of 12 outer cogs. The inner cogs are about 1 mm by 1 mm, spaced about 1 mm apart, for a total of 12 inner cogs. The sintered glass media may also be formed into other shapes including, for example, rods, spheres, or any other regularly or irregularly shaped three-dimensional structure. The dimensions above are representative of particular non-limiting embodiments. The sintered glass media may be formed into individual pieces having any dimensions desired.

It has also been discovered that silicon dioxide ($SiO_2$) based media may be utilized in addition to or as an alternative to sintered glass media in place of traditional media materials in biofilters for the removal of odorous compounds, for example, hydrogen sulfide, from contaminated air. In some embodiments, foamed glass media is made in molds that are packed with crushed or granulated glass mixed with a chemical agent, for example, calcium carbonate or limestone. At the temperature at which the glass grains become soft enough to cohere, the agent gives off a gas that is entrapped in the glass and forms a porous structure that remains after cooling. In some embodiments, the foamed glass media includes surface pores, and, in some embodiments, the foamed glass media includes voids within the structure.

In some embodiments, the foamed glass media is formed by using re-cycled glass material which makes the foamed glass media more economical. Individual pieces of the foamed glass media may include one or more passageways or channels extending from first surfaces of the individual pieces of the foamed glass media to second surfaces of individual pieces of the foamed glass media. The passageways or channels may be branched or forked, may follow a tortuous path through the media, and may vary in width along their lengths and/or include other inhomogeneities. An example of a commercially available foamed glass media is Growstone® recycled foamed glass media, available from Growstone, Inc.

Further, although described above as being formed from $SiO_2$, sintered media or foamed media in accordance with the present disclosure may include various impurities or additives or may be formed from alternate materials. For example, in some embodiments, the sintered or foamed glass media is formed from soda-lime glass which includes about 75% silicon dioxide (silica, $SiO_2$), sodium oxide ($Na_2O$), lime (CaO), and several minor additives, for example, magnesium oxide (magnesia, MgO) and aluminium oxide (alumina, $Al_2O_3$), from sodium borosilicate glass, which includes about 81% silica, about 12% boric oxide ($B_2O_3$), about 4.5% sodium oxide ($Na_2O$), and about 2% alumina, or from aluminosilicate glass which includes about 57% silica, about 16% alumina, about 4% boric oxide, about 6% barium oxide (BaO), about 7% magnesia, and about 10% lime. In other embodiments other ceramics, for example, alumina or silicon nitride ($Si_3N_4$), or elemental silicon may be formed into small particles or beads and sintered to form sintered media or processed to form foamed media for use in biofilters for the removal of $H_2S$ or other odorous or undesirable compounds from contaminated air.

Figure 5:
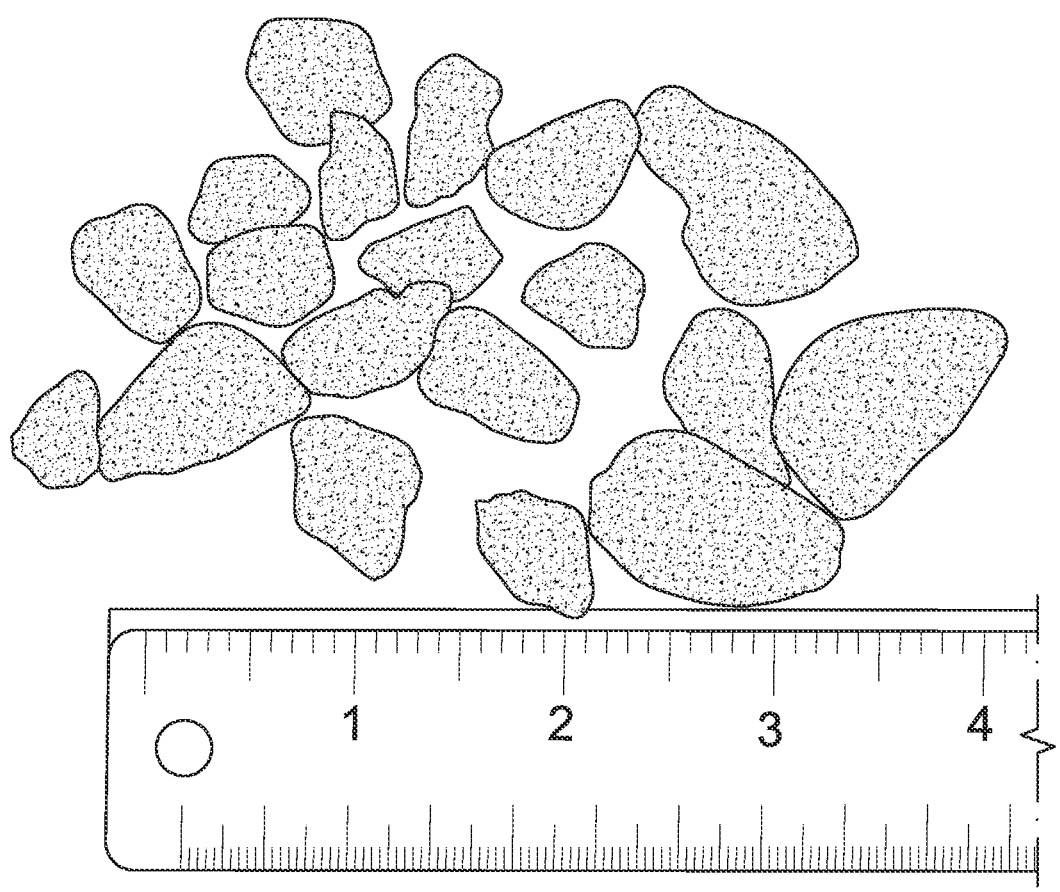
FIG. 5 is an image of an embodiment of a foamed glass biofilter media.
Figure 6A:
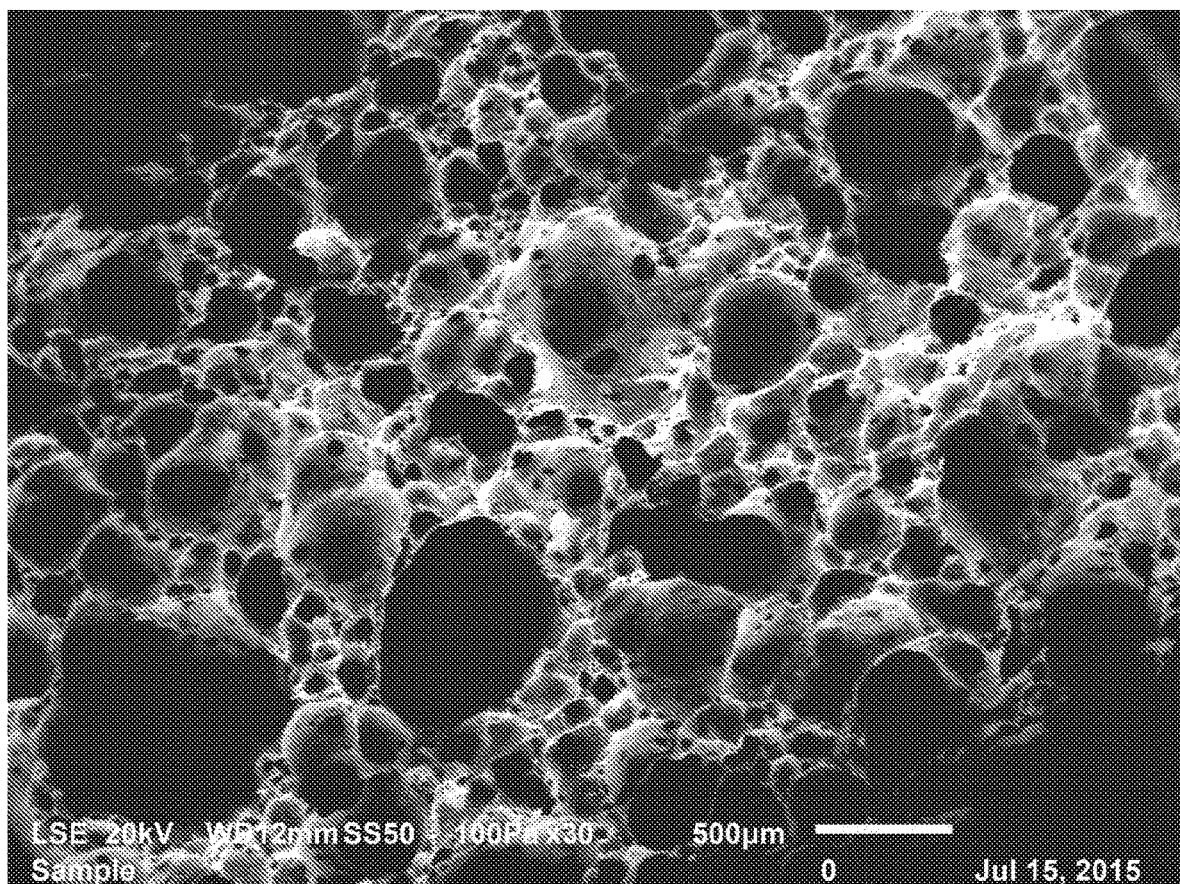
FIG. 6A is a scanning electron microscope micrograph of the surface of an embodiment of a foamed glass biofilter media.
Figure 6B:
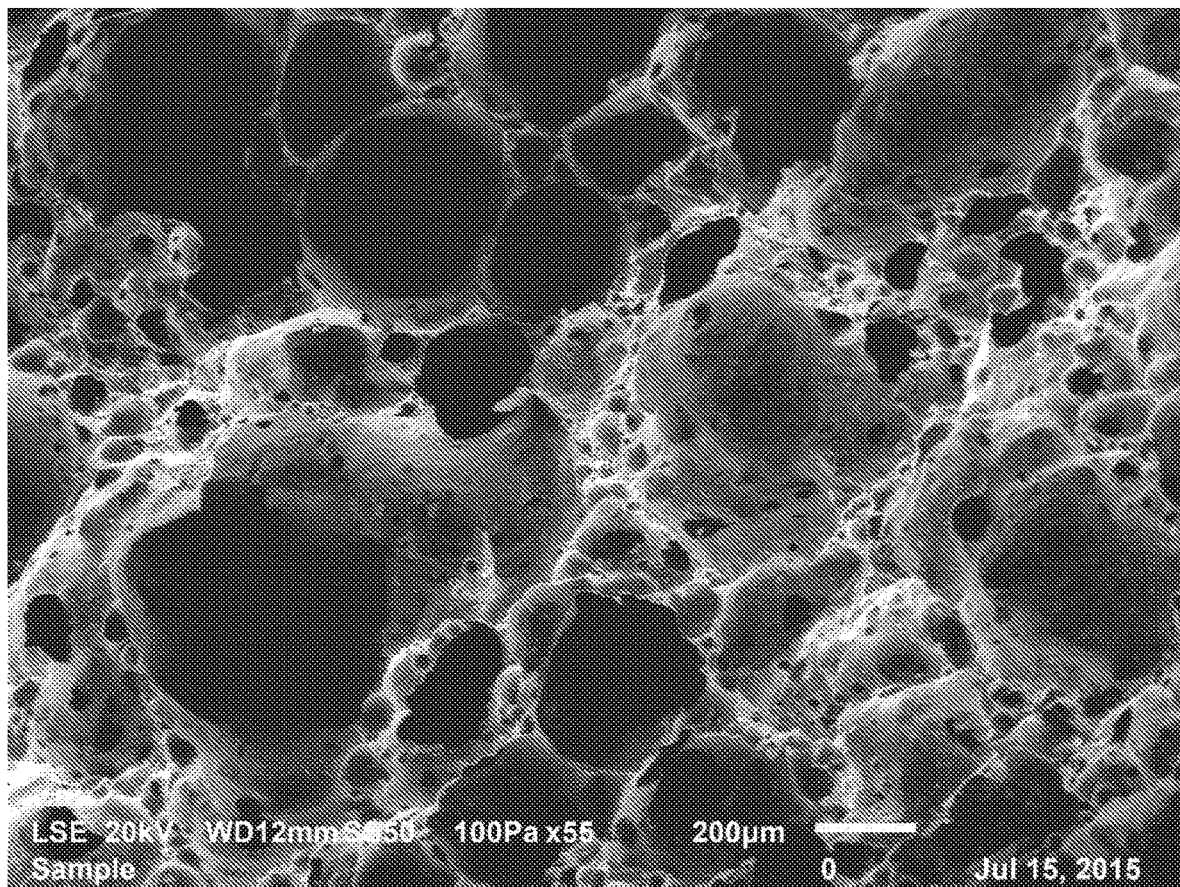
FIG. 6B is a scanning electron microscope micrograph of the surface of an embodiment of a foamed glass biofilter media.
Figure 6C:
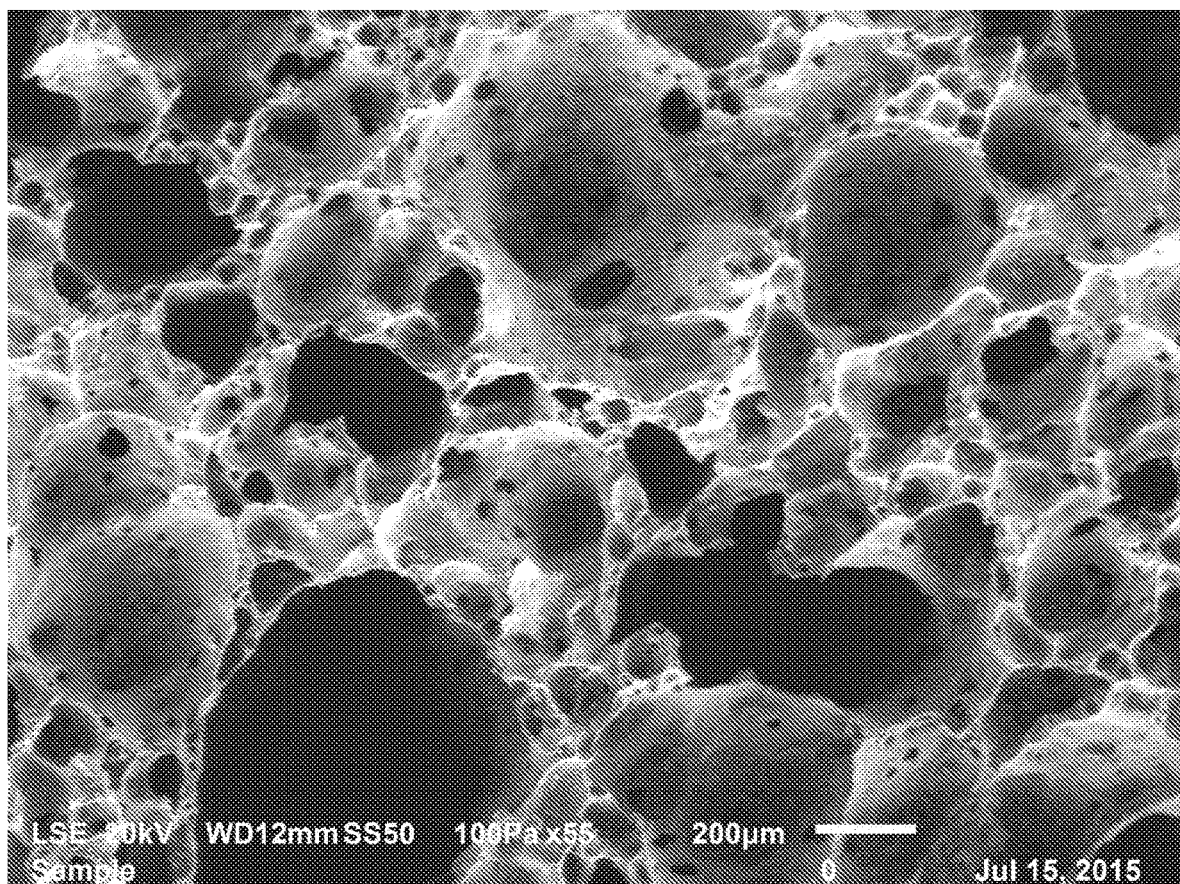
FIG. 6C is a scanning electron microscope micrograph of the surface of an embodiment of a foamed glass biofilter media.
Figure 6D:
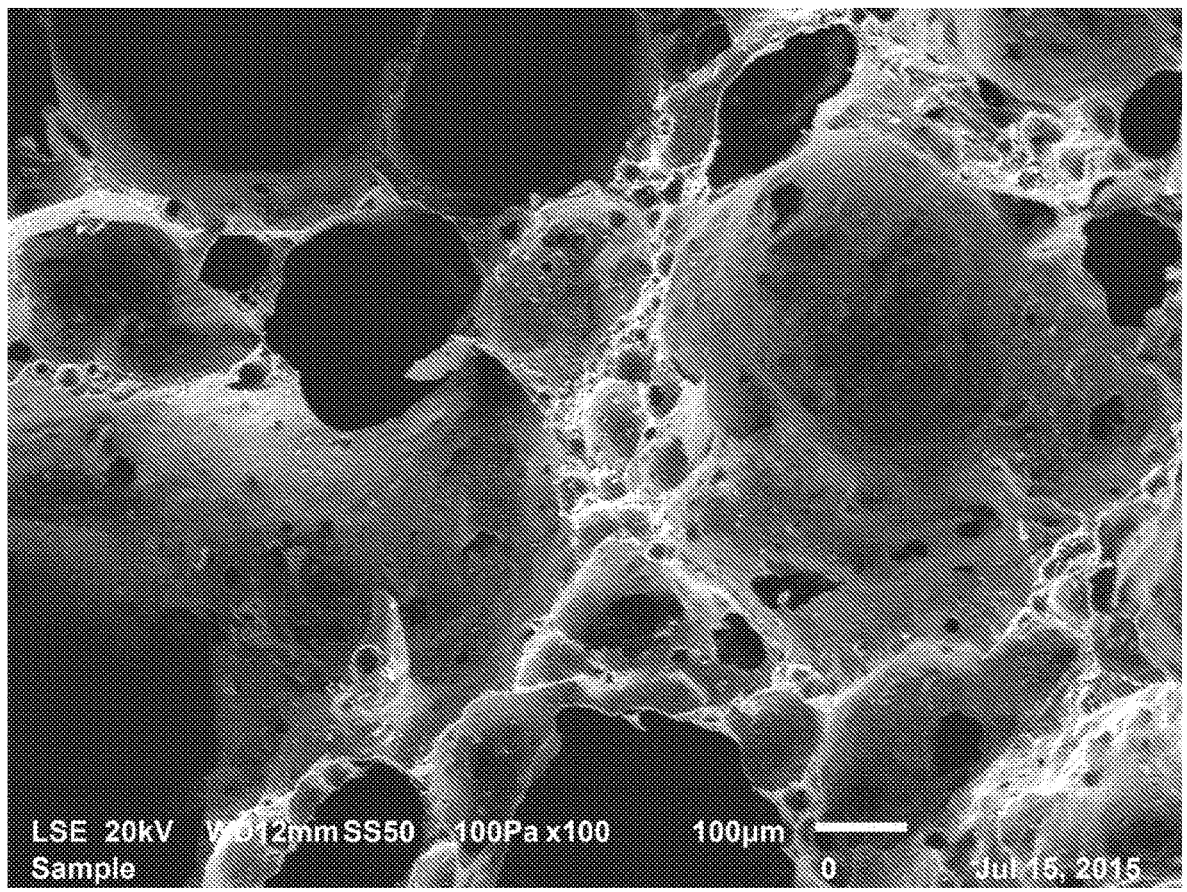
FIG. 6D is a scanning electron microscope micrograph of the surface of an embodiment of a foamed glass biofilter media.
Figure 6E:
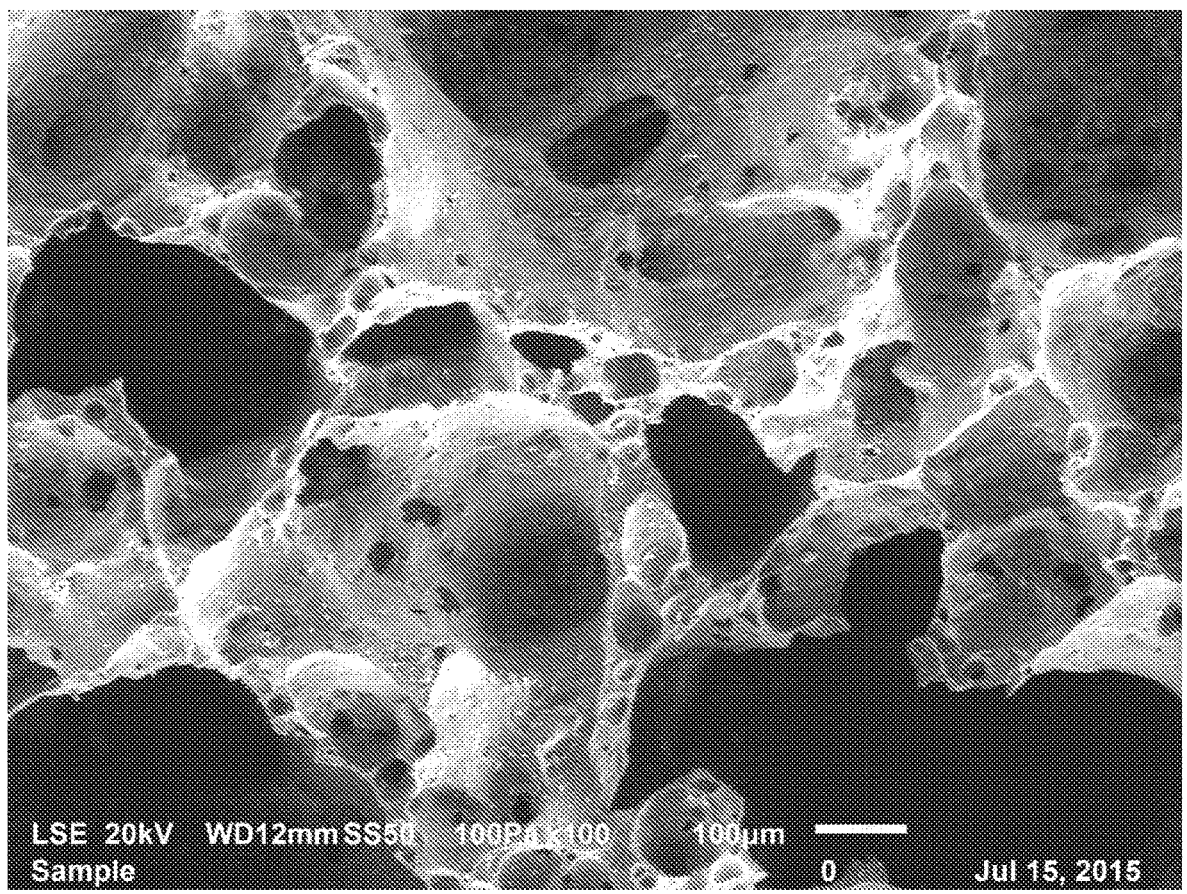
FIG. 6E is a scanning electron microscope micrograph of the surface of an embodiment of a foamed glass biofilter media.
Figure 6F:
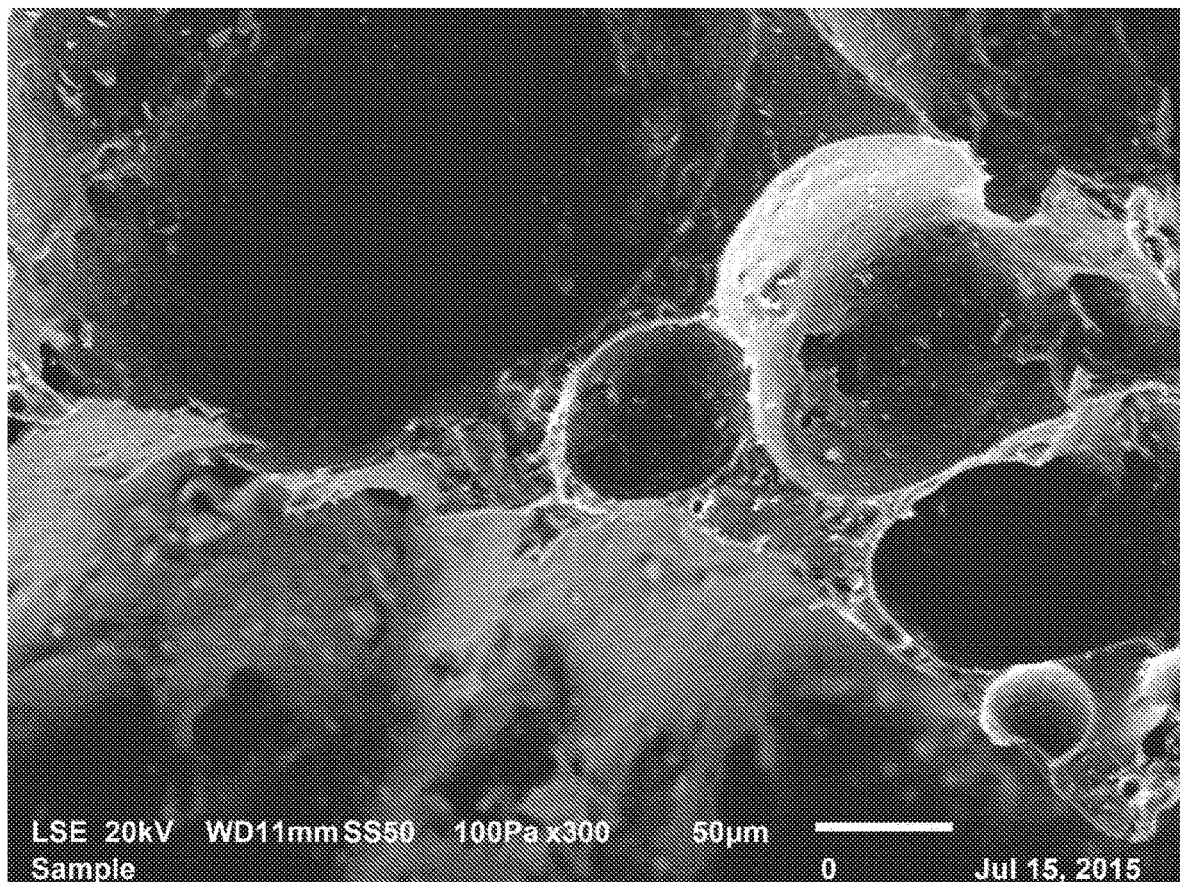
FIG. 6F is a scanning electron microscope micrograph of the surface of an embodiment of a foamed glass biofilter media.

FIG. 5 is an image of a sample of foamed glass media. As shown in FIG. 5, the foamed glass media may be irregularly shaped with a characteristic dimension of between about 0.5 inches (1.27 cm) and about one inch (2.54 cm). It should be appreciated, however, that foamed glass media particles having alternate dimensions and/or shapes from what is illustrated in FIG. 5 may be utilized. FIGS. 6A-6F are scanning electron microscope micrographs of the surface of examples of foamed glass media. As illustrated in FIGS. 6A-6F, the surface of the foamed glass media is highly porous, with pores of various random sizes and shapes and having characteristic dimensions of between about 25 μm and about 700 μm. It should be appreciated that foamed glass media with a different degree of porosity and/or having pores of different characteristic dimensions may alternatively or additionally be utilized in embodiments disclosed herein.

The large number of voids, pores, and low packing density of the foamed glass media provides the media with a large surface area on which bacteria may grow. In some embodiments, the foamed glass media may include up to about 80% or about 90% empty space. This high degree of porosity both provides a large amount of surface area on which hydrogen sulfide oxidizing bacteria may grow, and also provides the foamed glass media with a low density, for example, about 0.2 grams per $cm^3$, which makes the media more lightweight than traditional biofilter media and thus easier to handle and transport. The large surface area of the foamed glass media as compared to traditional media materials provides for the foamed glass media to operate with greater odor removal efficiency in a biofilter than media formed of traditional media materials. The increased odor removal efficiency of the foamed glass media may allow for a biofilter utilizing foamed glass media to be sized smaller than a biofilter utilizing traditional media materials while achieving equivalent odor removal performance, or alternatively, to achieve greater odor removal performance than an equivalently sized biofilter utilizing traditional media material.

In some embodiments, a biofilter utilizing foamed glass media for the gas phase removal of hydrogen sulfide from contaminated air is operable to remove greater than about 95%, and in some instances greater than about 98% or greater than about 99%, of hydrogen sulfide from contaminated air including greater than about 50 ppm, and in some instances greater than about 100 ppm, of hydrogen sulfide from the contaminated air when passed through a media bed having a volume of about one cubic meter at a rate of greater than about 250 cubic meters per hour, and in some instances at a rate of greater than about 500 cubic meters per hour. A biofilter utilizing foamed glass media for the gas phase removal of hydrogen sulfide from contaminated air may also be operable to remove hydrogen sulfide from contaminated air at substantially the same efficiencies when the contaminated air includes concentrations of hydrogen sulfide less than 50 ppm, for example, between about 0 ppm and about 50 ppm or between about 10 ppm and about 40 ppm.

Figure 7:
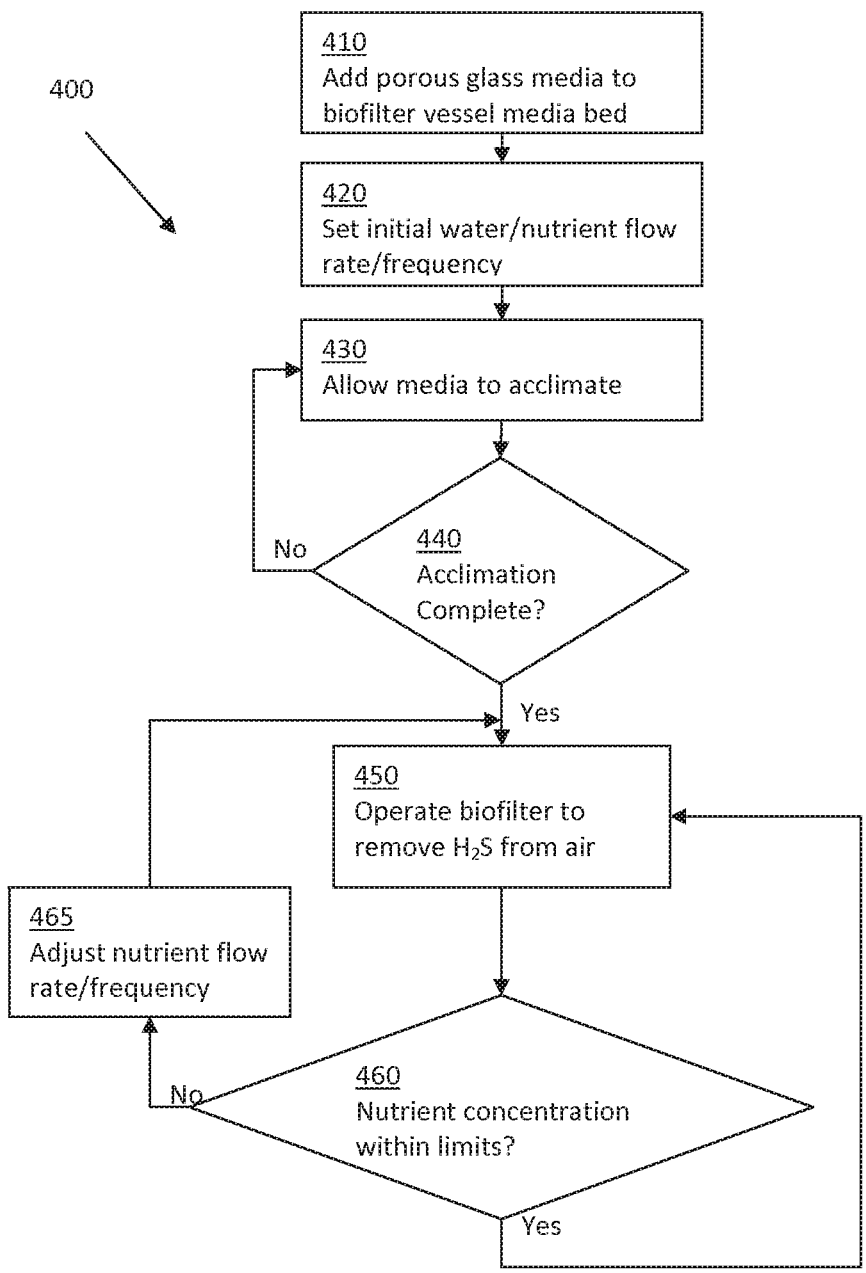
FIG. 7 is a flowchart of an embodiment of a method for treating a contaminated air stream using an embodiment of a biofilter as disclosed herein.
Figure 8:
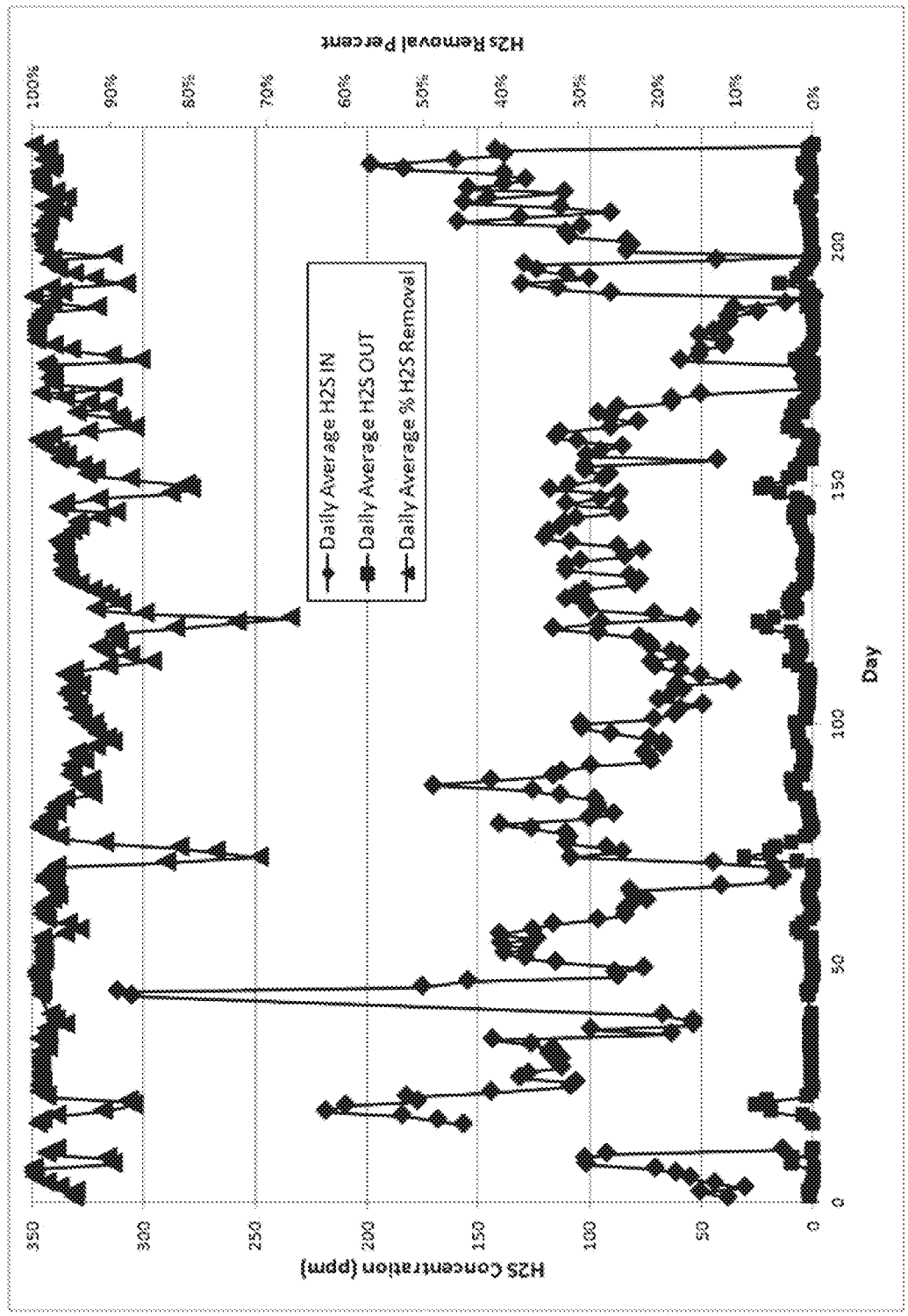
FIG. 8 is a chart of data obtained during testing of an embodiment of a biofilter including sintered glass biofilter media as disclosed herein.
Figure 9:
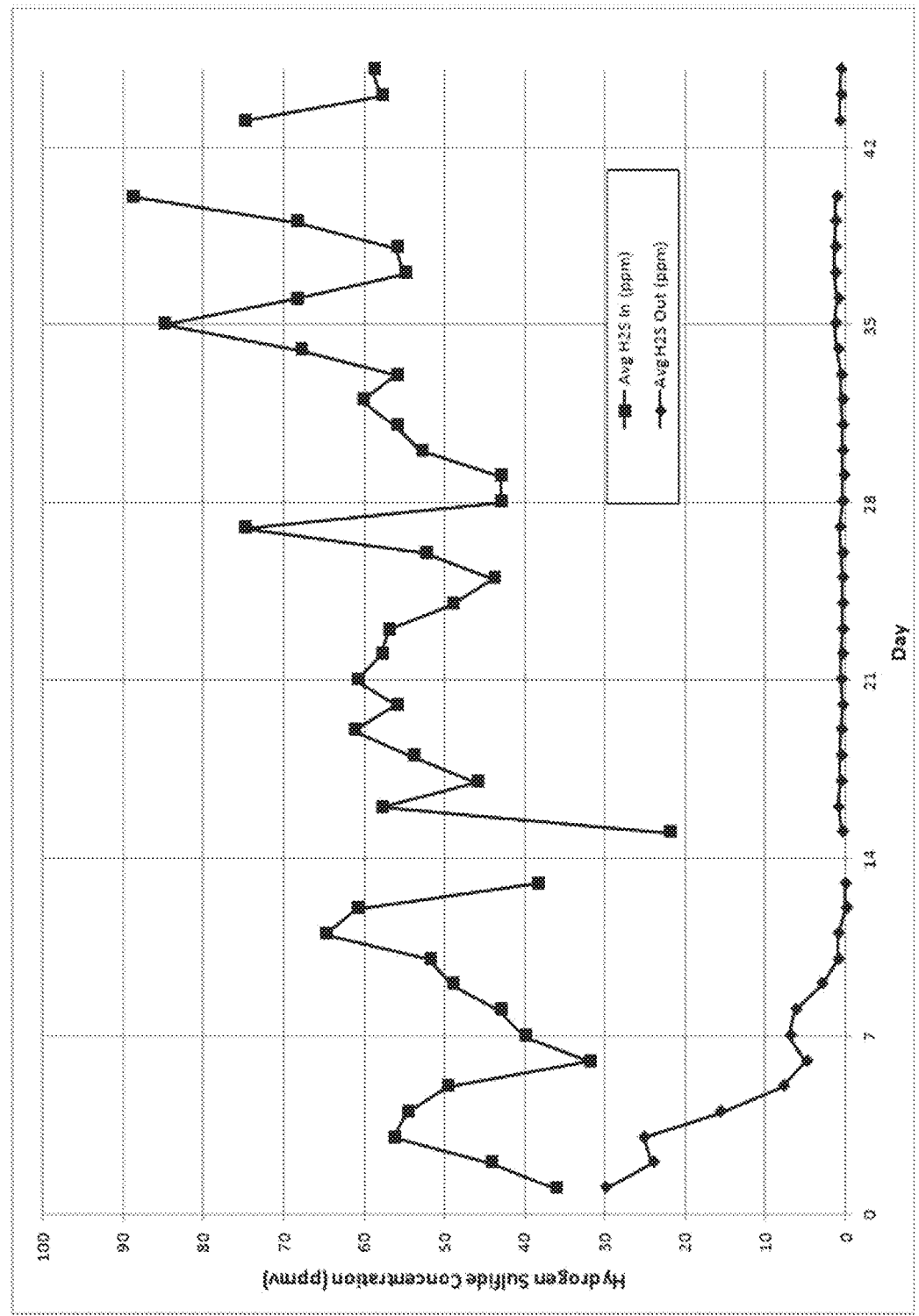
FIG. 9 is another chart of data obtained during testing of an embodiment of a biofilter including sintered glass biofilter media as disclosed herein.
Figure 10:
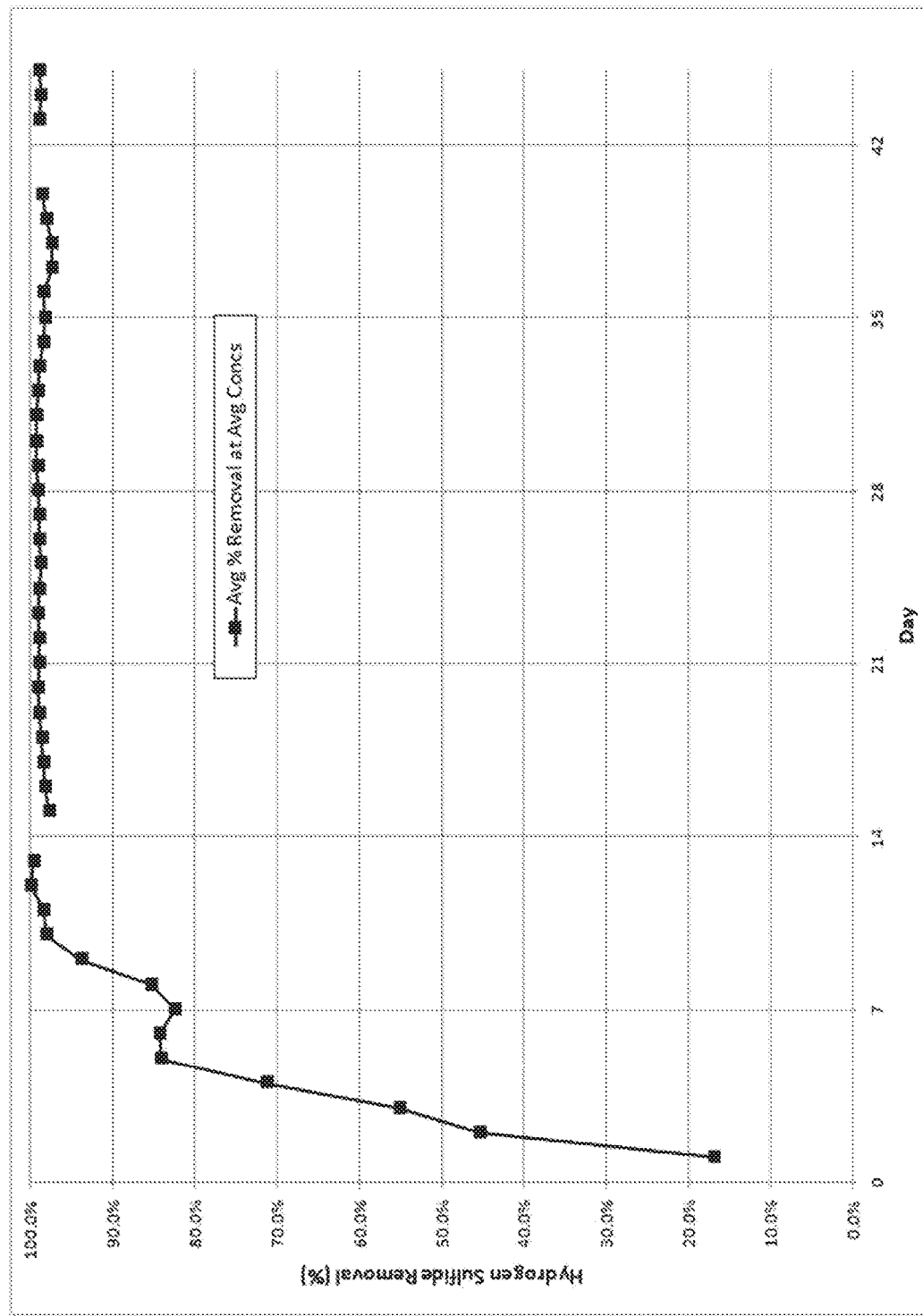
FIG. 10 is another chart of data obtained during testing of an embodiment of a biofilter including sintered glass biofilter media as disclosed herein.
Figure 11:
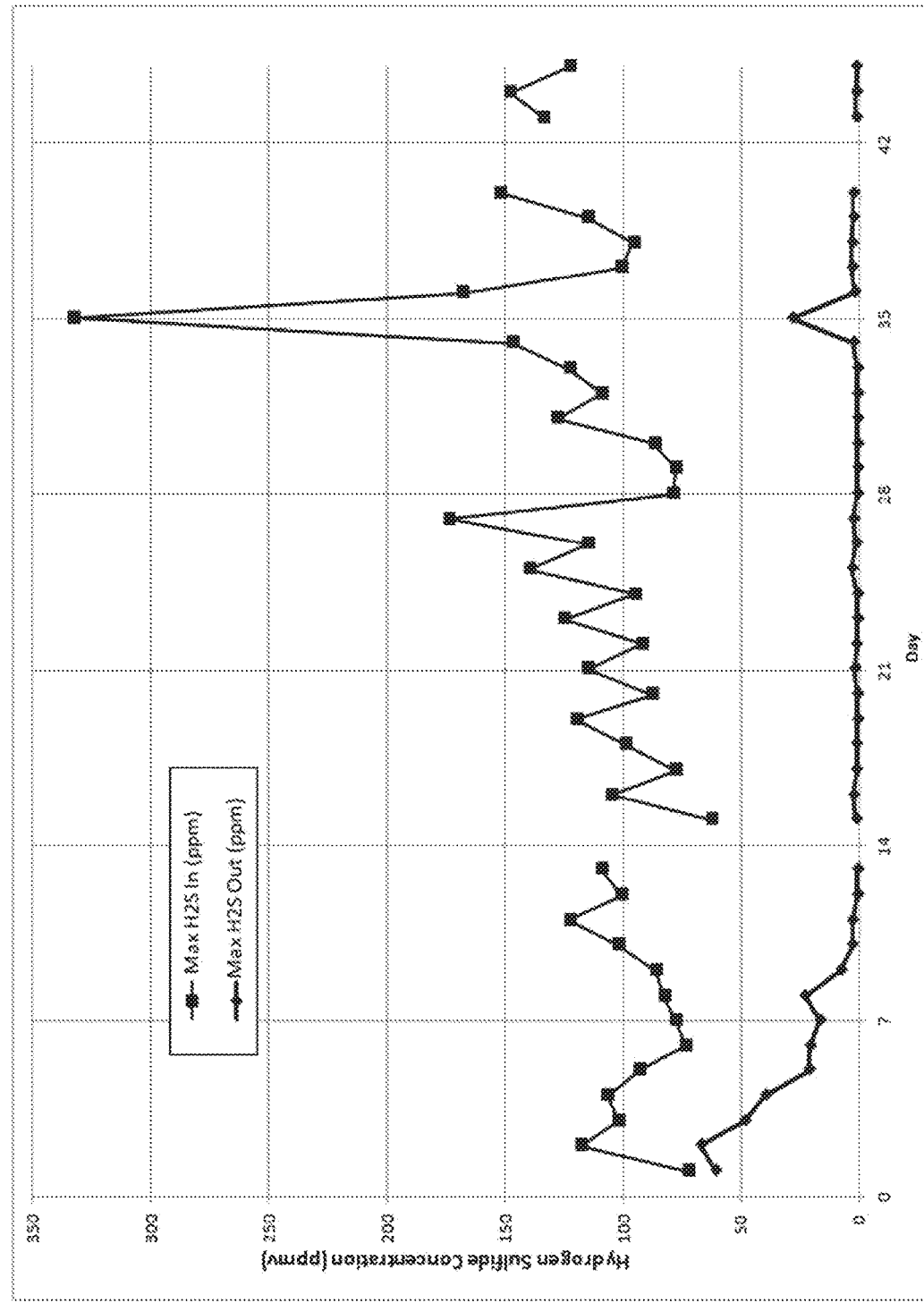
FIG. 11 is another chart of data obtained during testing of an embodiment of a biofilter including sintered glass biofilter media as disclosed herein.
Figure 12:
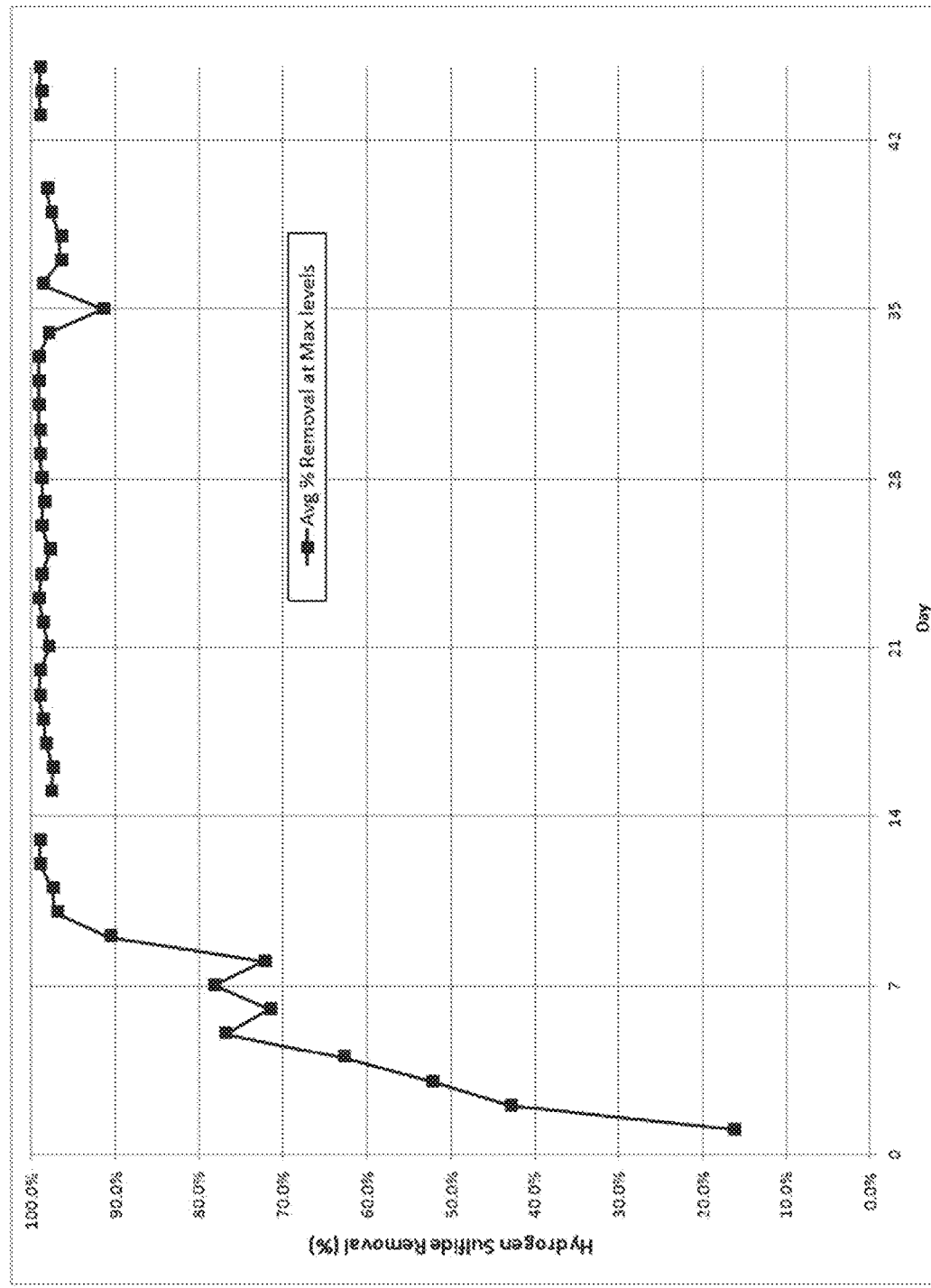
FIG. 12 is another chart of data obtained during testing of an embodiment of a biofilter including sintered glass biofilter media as disclosed herein.

FIG. 7 is a flowchart that depicts a method 400 of operation of a biofilter according to one or more illustrative embodiments of the invention. Although the operation of the biofilter is described primarily with respect to a routine that may be executed by a controller (e.g., controller 175 of FIG. 1), it should be appreciated that the invention is not so limited, and many of the acts described below may be implemented manually or batch-wise, for example, by a person, rather than by a controller, as discussed in more detail further below.

At act 410, a user may fill a media bed compartment of a biofilter vessel with media, for example, sintered glass media. In some embodiments, the sintered glass media is in the form of cylinder shaped media, and in other embodiments, gear shaped media and/or media of any other desired shape may be utilized. In other embodiments, the media bed compartment of the biofilter vessel is filled with foamed glass media as disclosed herein in addition to or as an alternative to the sintered glass media.

At act 420, an initial flow rate and or frequency of addition of water and/or nutrients to the biofilter is set. These parameters may be set through a user interface, for example, input device 208 of a controller for the biofilter and may be stored in a memory of the controller. The initial parameters may be determined from historical data from other similar biofilters.

In act 430, the media is allowed to acclimate. Acclimation of the media may include flowing moist, bacteria laden contaminated air from a sewage system or other location where the biofilter is installed through the biofilter vessel. Nutrients and water may be periodically added to the biofilter vessel to provide an environment conducive for growth of a desirable bacterial population. Bacteria will adhere to the media in the media bed and multiply by consuming the provided nutrients and hydrogen sulfide from the contaminated air flowed through the biofilter. Additionally or alternatively, a desirable species of bacteria may be added directly to the media bed by an operator.

At act 440, it is determined whether the media has completed acclimation. Completion of acclimation may be determined by comparing a concentration of hydrogen sulfide exiting the biofilter to a concentration of hydrogen sulfide in contaminated air entering the biofilter. A reduction in hydrogen sulfide concentration of about 95% or more may be indicative of the media being acclimated. Additionally or alternatively, production of sulfuric acid by the bacteria may provide an indication of completion of acclimation of the media. The pH of fluid within the biofilter and/or waste fluid exiting a fluid outlet of the biofilter may be monitored. When the fluid reaches a pH below a threshold value, for example, below about 4, below about 2.2 or between about 1.8 and about 2.2, this may be indicative of the media being acclimated.

Upon completion of acclimation of the media, the biofilter may begin normal operation for removing $H_2S$ and/or other undesirable compounds from air passed through the biofilter (act 450). During operation, various parameters of fluid within the biofilter and/or exiting the biofilter from the drain 170 of the biofilter vessel may be measured by various sensors and information regarding the measurements provided to a controller of the biofilter to determine if adjustment of any operating parameters is warranted, and if so, to adjust the relevant operating parameters. For example, the concentration of nutrients or a component of nutrients in fluid within the biofilter and/or exiting the biofilter from the drain of the biofilter vessel may be measured by a nutrient concentration monitor and compared to a desired range of concentration values by the controller (act 460). If the nutrient concentration of the fluid within the biofilter and/or exiting the biofilter from the drain of the biofilter vessel is outside the desired range, the controller may adjust the flow rate and/or frequency of addition of nutrients to the biofilter vessel (act 465). For example, if the nutrient concentration of the fluid within the biofilter and/or exiting the biofilter from the drain of the biofilter vessel is above an upper threshold, this may be indicative of an excessive amount of nutrients being provided to the biofilter vessel. If the nutrient concentration is above this upper threshold, the flow rate and/or frequency of addition of nutrients to the biofilter vessel may be decreased. If the nutrient concentration of the fluid within the biofilter and/or exiting the biofilter from the drain of the biofilter vessel is below a lower threshold, this may be indicative of an insufficient amount of nutrients being provided to the biofilter vessel. If the nutrient concentration is below this lower threshold, the flow rate and/or frequency of addition of nutrients to the biofilter vessel may be increased. The flow rate and/or frequency of addition of nutrient to the biofilter vessel may be adjusted until the nutrient concentration of the fluid within the biofilter and/or exiting the biofilter from the drain of the biofilter vessel is in a range between the upper and lower threshold values.

Although several of the acts described herein have been described in relation to being implemented on a computer system or stored on a computer-readable medium, it should be appreciated that the invention is not so limited. Indeed, any one or more of the acts may be implemented by, for example, an operator, without use of an automated system or computer. For example, the measuring of the parameters of the fluid within and/or exiting the biofilter from the drain of the biofilter vessel may be performed by a human operator, and based upon those parameters, that operator, or another operator may manually adjust amounts or frequency of addition of the water and/or nutrients to the biofilter vessel. Moreover, the determinations made at acts 440, 460, 470, and/or 480 may be performed by a person, perhaps with the aid of a simple flow chart. Accordingly, although the method 400 was described primarily with respect to being implemented on a computer, it should be appreciated that the invention is not so limited.

It should be appreciated that numerous alterations, modifications, and improvements may be made to the illustrated method. For example, any of the acts of the method 400 may be performed in alternate orders than illustrated. Any one or more of the acts illustrated may be omitted from embodiments of the method 400 and in some embodiments, additional acts may be performed.

Example 1A

Testing of Cylindrical Sintered Glass Media

Testing was performed to evaluate the performance of sintered glass media for the removal of hydrogen sulfide from contaminated air in a biofilter as described herein. The media was formed as cylinders having an outside diameter of approximately 15 mm, an inside diameter of approximately 10 mm, and a length of approximately 15 mm. The media were trialed in a stock Zabocs® ZB30 vessel using a side stream of foul air withdrawn from the wet well at a lift station in southwest Florida. The Zabocs® ZB30 vessel had a cross sectional area of 4.9 $ft^2$ (0.455 $m^2$) and included a single media bed with a height of 31.5 inches (0.8 m) and a total volume of 12.9 $ft^3$ (0.365 $m^3$). Airflow through the vessel was approximately 100 cfm (cubic feet per minute, 170 $m^3$/h).

The site was visited on a regular twice weekly schedule at which time operation parameters were observed and adjustments were made to optimize the system. These parameters included inlet and outlet concentrations of hydrogen sulfide, water, and nutrient spray schedule and flow rate, pH, temperature, and nutrient concentration of the water in the vessel, rate of air flow through the vessel, and pressure drop across the vessel. Fan speed was adjusted to maintain the vessel at design hydraulic capacity per Pitot tube pressure differential measurements.

Recording hydrogen sulfide monitors (OdaLog® portable gas detectors from App-Tek International) were deployed to record the hydrogen sulfide concentration in air introduced into the vessel and output from the vessel every five minutes, so that average and maximum hydrogen sulfide concentrations could be observed on a daily basis.

The Zabocs® ZB30 vessel was filled with cylindrical sintered glass media. The evaluation of the performance of the biofilter including the cylindrical sintered glass media was performed over a seven month period.

The cylinders required very little acclimation time. On startup the hydrogen sulfide removal rate was over 95% in the first 24 hours and improved to 99% within four days.

Spikes in the influent hydrogen sulfide concentration caused breakthrough to the exhaust of unacceptable hydrogen sulfide concentrations and percent removal decreased.

During winter months in the middle of the testing period the efficiency of hydrogen sulfide removal was significantly less than the 99% removal rate target. It is assumed that this was due to the effect of lower temperatures on the metabolism of the bacteria in the biofilter.

At several points during the testing, the hydrogen sulfide removal rate dropped below 90%. These drops in hydrogen sulfide removal rate were due to operation failures, including two incidents of increase in influent hydrogen sulfide concentration requiring re-acclimation of the biofilter, and a few instances of the nutrient supply failing. All dates when removal fell to less than 90% were accompanied by operating problems and errors.

The results of the testing of the cylindrical sintered glass media are summarized in Table 1 below and in the chart in FIG. 6.

TABLE 1

| Media | Daily Average H$_2$S In (ppm) | Daily Average H$_2$S Out (ppm) | Daily Average % Removal | Average Daily Maximum H$_2$S In (ppm) | Average Daily Maximum H$_2$S Out (ppm) | Average Daily % Removal at Maximum H$_2$S In |
|---|---|---|---|---|---|---|
| Cylindrical Sintered Glass | 91 | 2.25 | 97.5 | 168 | 14.5 | 91.4 |

Example 1B

Testing of Gear-Shaped Sintered Glass Media

Figure 4B:
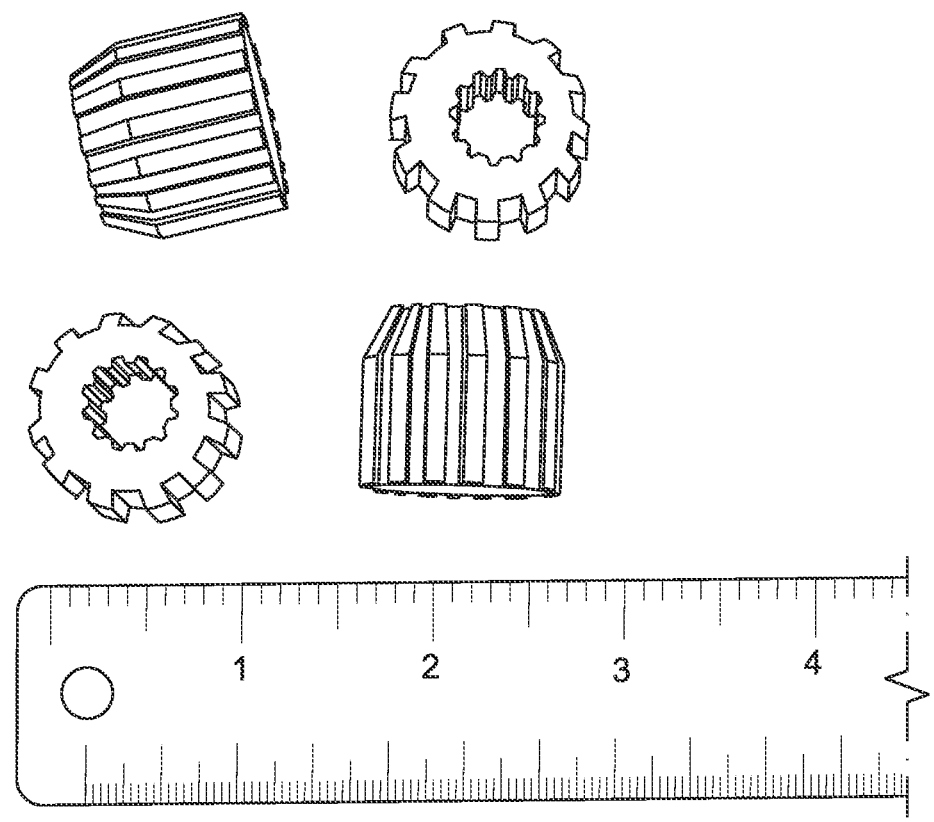
FIG. 4B is an image of another embodiment of a sintered glass biofilter media.

After testing of the cylinder media was completed, the cylinder media was removed from the Zabocs® ZB30 vessel which was then filled with 80 centimeters (31.5 inches) of gear shaped sintered glass media as illustrated in FIG. 4B. The gear shaped sintered glass media included a roughly cylindrical body approximately 20 mm long with an outside diameter of approximately 26 mm and inside diameter of approximately 10 mm with cogs along both inner and outer walls. The outer cogs are about 5 mm by 5 mm placed about 2 mm apart for a total of 12 outer cogs. The inner cogs are about 1 mm by 1 mm, spaced about 1 mm apart, for a total of 12 inner cogs. The average daily hydrogen sulfide removal rate was 17% when the vessel was put into operation and improved each day until reaching 100% after 11 days of operation. The vessel then maintained an average daily removal rate of 98.8%, and no days with less than 97.5%. The average influent hydrogen sulfide concentration was 55.8 ppmv (parts per million by volume) and the average exhaust hydrogen sulfide concentration was 0.7 ppmv. During that same period the average daily peak influent hydrogen sulfide concentration was 118 ppmv and the average daily peak exhaust hydrogen sulfide concentration was 2.5 ppmv giving an average of 98.0% removal at peak loading.

The results of the testing of the gear shaped sintered glass media are summarized in Table 2 below and in the charts in FIGS. 7-10.

TABLE 2

| Media | Daily Average H$_2$S In (ppm) | Daily Average H$_2$S Out (ppm) | Daily Average % Removal | Average Daily Maximum H$_2$S In (ppm) | Average Daily Maximum H$_2$S Out (ppm) | Average Daily % Removal at Maximum H$_2$S In |
|---|---|---|---|---|---|---|
| Gear Shaped Sintered Glass | 55.8 | 0.8 | 98.8 | 118 | 2.5 | 98.0 |

Discussion

Pressure Drop

The pressure drop across the media bed remained low at under 0.5 inches water column (iwc) for the cylinder shaped media and under 0.1 iwc for the gear shaped media. This indicates little, if any, media breakdown, and open free flow through the media.

Low Hydrogen Sulfide Removal Rate

The data collected shows a decrease in hydrogen sulfide removal rate during cold months for the cylinder shaped media. The rate slowly decreased to 90% and below, and then increased as spring arrived. Upon review of all data collected over the course of the testing of the cylinder shaped media, the media failed to meet 99% hydrogen sulfide removal during cold weather even though all key performance indicators were within the optimal values used for other media. This was not the case when using the gear shaped media as it was only tested during relatively cold weather of February and March. Without being bound to a particular theory, it is surmised that the gear shaped media exposes more surface area, allowing exposure of more bacteria to air flowed through the media bed.

The watering system was the adjusted to run at a frequency to keep the media moist and for a period to maintain drain pH in the range from 1.8 to 2.2 and drain NO$_3$—N concentrations between 2 ppm and 10 ppm. Whenever the pH varied outside this range, removal was hampered. Likewise, if insufficient nutrient was supplied and nitrate was not found in the drain water, hydrogen sulfide removal was negatively affected.

Insufficient bulk density (too much open space in the media) may also have been the cause of lower removal rates for the cylinder shaped media. Since the media has a great amount of open space, contaminated air may have been more likely to pass through the bed untreated than when utilizing media having a less open structure.

Acclimation

The fast acclimation of the cylinder shaped material and high hydrogen sulfide removal early in testing was extremely promising. The surface of the media did not have a visible biological film, so without being bound to a particular theory, it is surmised that the acclimation of the media may have been caused by a process other than bacteria oxidizing hydrogen sulfide to form sulfuric acid.

The fast acclimation may have been due in part to adsorption. The small pores in the surface of the sintered glass would cause capillary action to naturally occur. Once the water in the pores was saturated in $H_2S$, the hydrogen sulfide removal would have dropped.

Whatever the initial $H_2S$ removal mechanism may have been, the high initial media performance dropped off and then slowly increased to an acceptable level. Adjustments continued to attain optimum operating conditions.

The gear shaped media did not exhibit the same immediate high hydrogen sulfide removal rate as the cylinder shaped media, but rather exhibited an acclimation period over a similar period of time as other media commonly used in biofilters.

Example 1A, 1B Conclusions

The cylinder shaped sintered glass media does not show signs of breakdown after operation of over six months. Likewise the gear shaped media, though tested for a shorter period of time, has shown no signs of breakdown.

Sintered glass media exhibits high rates of $H_2S$ removal from contaminated air, and thus has potential for use as a biofilter media having superior properties, for example, lower density, longer service life, and higher $H_2S$ removal efficiency than traditional filter media.

The cylinder shaped media configuration may contain too much open space through which foul air can channel without treatment. The gear shaped media exhibited better $H_2S$ removal efficiency than the cylinder shaped media.

Example 2A

Testing of Foamed Glass Media at Site 1

Testing was performed to evaluate the performance of foamed glass media for the removal of hydrogen sulfide from contaminated air in a biofilter as described herein. The media used was Growstone® foamed glass media. The media were trialed in a stock Zabocs® 4000 biofilter, available from Evoqua Water Technologies LLC, using a side stream of foul air withdrawn from the wet well at a lift station in southwest Florida. The Zabocs® 4000 biofilter vessel had a cross sectional area of 16 ft$^2$ (1.49 m$^2$) and included upper and lower media beds with a heights of 48 inches (1.21 m) and a total volume of 64 ft$^3$ (1.81 m$^3$).

Monitoring of the performance of the Zabocs® biofilter was performed from July 2014 through April 2015. The site was surveyed weekly and hydrogen sulfide data loggers (OdaLog® portable gas detectors) were deployed to determine biofilter performance.

Hydrogen sulfide concentrations from the influent, from the space between media beds, and from the exhaust was measured continually and recorded every five minutes. The data from the OdaLog® portable gas detectors was collected, processed, saved, and recorded along with all other data collected.

The foamed glass media was installed during a media exchange on Jul. 18, 2014 by removing the spent media from the biofilter and replacing it with 64 ft$^3$ (1.8 m$^3$) of the foamed glass media. The biofilter was started at 50% of design air flow, operating at approximately 175 cfm (297 m$^3$/h). On July 22 the hydrogen sulfide removal rate was 91%. On July 26 the hydrogen sulfide removal rate was 96%, on July 27 and 28 the hydrogen sulfide removal rate was 98%, and on July 29 the target of 99% hydrogen sulfide removal was attained with 98 ppmv hydrogen sulfide in the influent stream and 1.2 ppm in the effluent stream. On July 29 the peak hydrogen sulfide in the influent stream was 204 ppmv with a peak exhaust hydrogen sulfide of 8.4 ppmv for 96% removal at peak. During this eleven day period adjustments and corrections were performed so that the system reached full acclimation three days after final adjustment.

Over the next seven months the system operated at the targeted hydrogen sulfide removal rate with several exceptions. In each of these instances either some operating parameter was out of adjustment or the concentration of influent hydrogen sulfide drastically increased or decreased over a short period of time. Once corrected, the biofilter returned to achieving a 99% hydrogen sulfide removal rate.

On March 15 the top access port on the vessel blew out relieving back pressure from the carbon drums and the system operated for five days at 499 cfm (848 m$^3$/h), 150 cfm greater than design. The hydrogen sulfide removal rate dropped to between 95% and 97%. Following replacement of the access port and reacclimation, removal of hydrogen sulfide met the 99% removal rate specification until monitoring halted on April 15.

Figure 13:
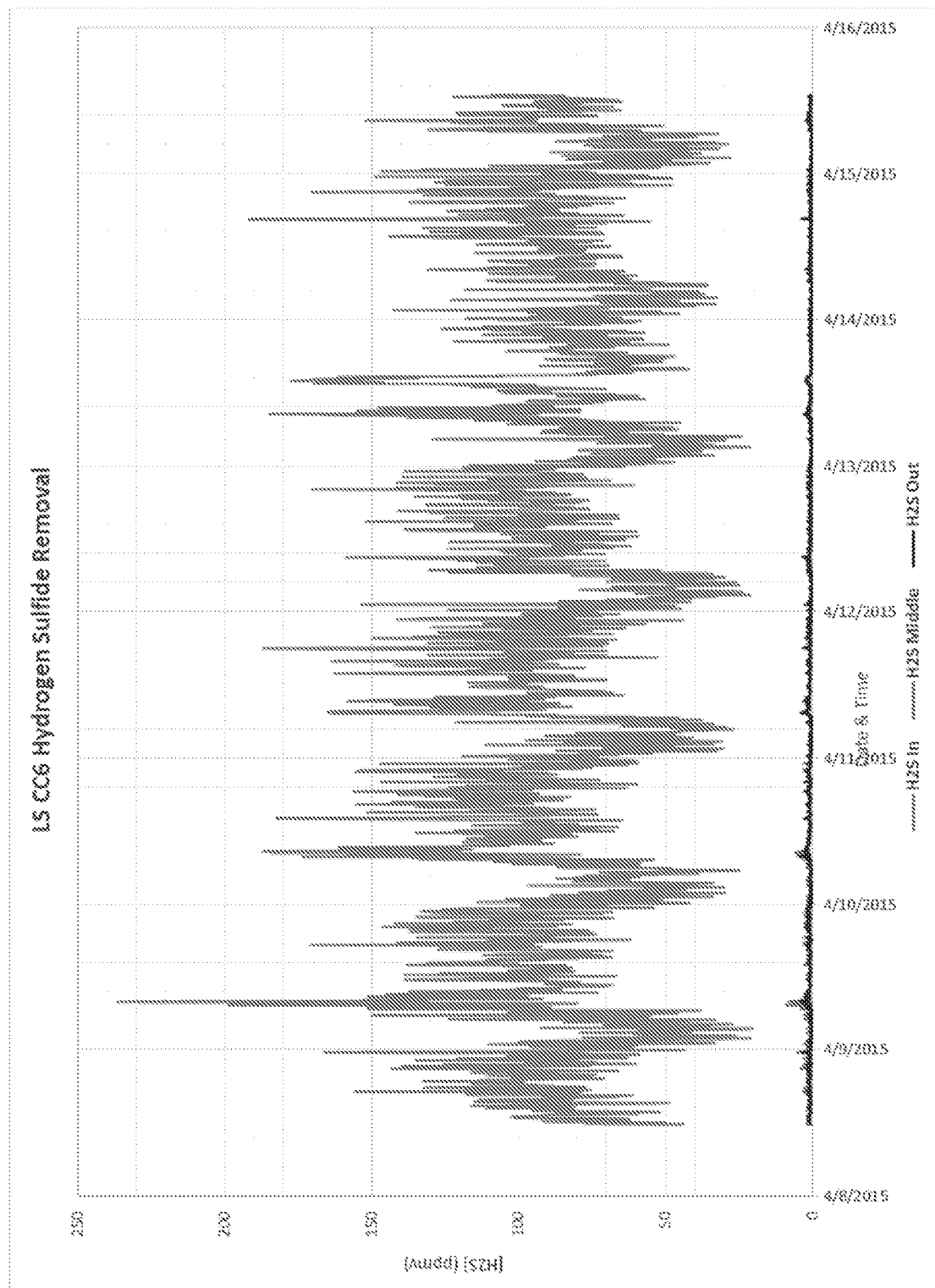
FIG. 13 is a chart of data obtained during testing of an embodiment of a biofilter including foamed glass biofilter media as disclosed herein.

Data illustrating hydrogen sulfide removal with the biofilter utilizing the foamed glass media for an exemplary one week period is shown in the graph of FIG. 13.

Discussion

Nutrient

During this trial, on two occasions there was no nitrate residual in the drain water, once due to a nutrient pump failure, and once due to a plugged eductor. In both cases, in the absence of nutrient, the hydrogen sulfide removal rate of the biofilter decreased.

Drain pH

The drain pH of the biofilter correlated with both the influent hydrogen sulfide concentration and the amount of water contacting the media. If a high influent of hydrogen sulfide was observed, generally an average of over 100 ppmv, drain water pH tended to be low. Instances where drain pH was above 2.2 were far more common due to hydrogen sulfide concentration below the expected 100 ppmv.

It is important to note that the pH will naturally fluctuate based on the incoming hydrogen sulfide concentration. Therefore, depending on the time of day and any other factors that affect wet-well hydrogen sulfide concentrations, a surveyor may get varied results from visit to visit, even when no operating parameters have changed.

Pressure Drop

After 9 months of operation, the pressure drop across the vessel was 0.4 iwc, the same as it was two weeks after start-up. That, along with failure to observe changes in the media or bed height, indicates that the foamed glass media does not readily decompose.

Hydrogen Sulfide Removal Rate

As previously stated, low hydrogen sulfide removal rates correlated directly to low nutrient levels in the drain, out of range drain water pH, low influent hydrogen sulfide concentrations, and air flow greater than design.

Additionally, hydrogen sulfide removal rate may be low when influent hydrogen sulfide concentration is very high or has very high peak (maximum) concentrations. The bacteria in the biofilter are limited as to the quantity of hydrogen sulfide they can consume. The population of the culture is limited by the amount of hydrogen sulfide available, and the ability of the culture to remove hydrogen sulfide depends on its population. The culture population will adjust to the amount of hydrogen sulfide, but the adjustment time is generally measured in hours, sometimes days. The biofilter utilized in this testing was designed for operation with an influent of 100 ppmv $H_2S$ at 350 cfm. If there are extremely high peaks, the bacteria cannot perform to the required capacity. Lower concentrations are more difficult to achieve 99% removal since the effluent concentrations required are so low.

Example 2B

Testing of Foamed Glass Media at Site 2

Testing was performed to evaluate the performance of foamed glass media for the removal of hydrogen sulfide from contaminated air in a biofilter as described herein. The media used was Growstone® foamed glass media. The media were trialed in a stock Whisper® 72 biofilter, available from Evoqua Water Technologies LLC, using a side stream of foul air withdrawn from the wet well at a lift station in southwest Florida. The Whisper® 72 biofilter vessel had a cross sectional area of 28.3 $ft^2$ (2.63 $m^2$) and included upper and lower media beds with a total height of 57 inches (1.45 m) and a total volume of 134 $ft^3$ (3.8 $m^3$).

On Aug. 14, 2014, a Whisper® 72 biofilter was installed at a lift station in southwest Florida. It was filled with 134 $ft^3$ (3.8 $m^3$) of Growstone® foamed glass media distributed in two beds. Over the next nine months performance was continually monitored by OdaLog® portable gas detectors deployed on-site and weekly visits surveyed the operating parameters of the system.

The Whisper® 72 biofilter with foamed glass media was installed on Aug. 14, 2014. The biofilter was started at approximately one-third of design air flow, operating at approximately 200 cfm (340 $m^3$/h) of a design air flow of 600 cfm (1,019 $m^3$/h). At two weeks the flow was increased to two-thirds of design, 400 cfm (680 $m^3$/h). Data for the first month of operation indicated poor hydrogen sulfide removal, ranging from 70% to 95% removal. A design flaw was noted that the single pigtail nozzle for the bottom bed gave a pattern such that an estimated 80% of the water sprayed the inner one-half diameter of the vessel and even in circles concentric from the nozzle, the water spray was uneven and that channeling was occurring. On Mar. 23, 2015, the single pigtail spray nozzle on the bottom bed was replaced with an improved design spray apparatus such that the bed surface received approximately the same amount of water and nutrient per unit surface area of the media. The top nozzle was timed to operate less than one percent of the time that the bottom water was on. Within three days the bed had acclimated so that on March 28 the average daily hydrogen sulfide removal rate was 99.7%. In the sixty days after that, the hydrogen sulfide removal rate was equal to or greater than 99% for fifty-eight of the sixty days. Both days that the goal was missed there were sudden increases in the load on the system. The first day that the goal was missed was May 18, the day when the air flow was increased from 438 cfm (744 $m^3$/h) to 625 cfm (1,062 $m^3$/h), yet the hydrogen sulfide removal rate was 97%. Within twenty-four hours the media had acclimated to the increased flow. Then, on May 23 the concentration of hydrogen sulfide in the air stream jumped from a morning average of 37 ppmv before 10:00 AM to 199 ppmv average for the rest of the day. On that day the hydrogen sulfide removal rate was 95%. The unusually high concentration of hydrogen sulfide from the wet well continued for two more days, yet the biofilter acclimated and returned to achieving a 99% hydrogen sulfide removal rate by the following day.

Figure 14:
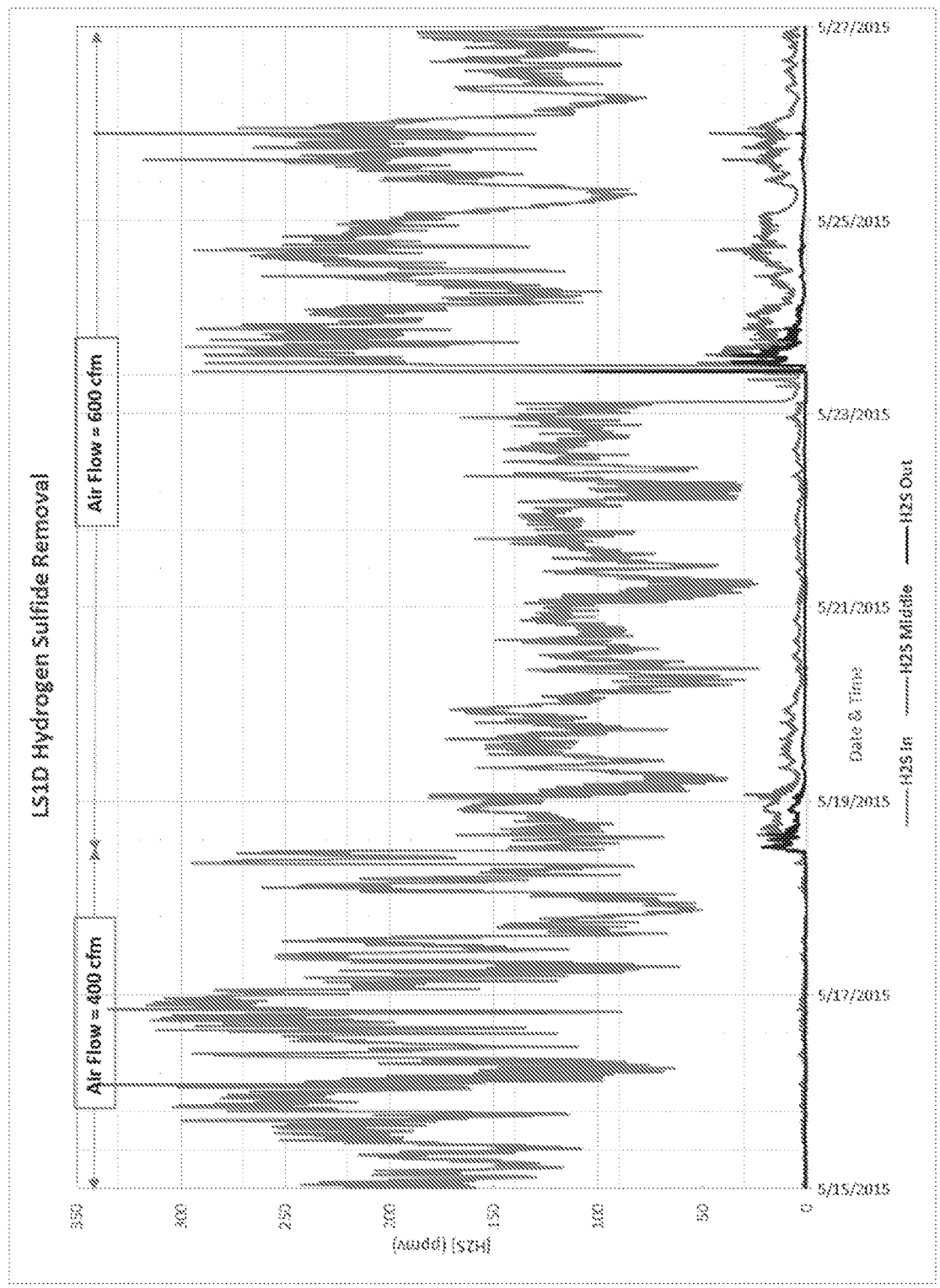
FIG. 14 is another chart of data obtained during testing of another embodiment of a biofilter including foamed glass biofilter media as disclosed herein.

Data illustrating hydrogen sulfide removal with the biofilter utilizing the foamed glass media for a one week period including the May 18 and May 23 excursions is shown in the graph of FIG. 14.

Discussion

Nutrient

During this trial there it was observed that maintaining nutrient concentrations such that nitrate nitrogen was at least 5 ppm allowed the biofilter unit to operate efficiently.

Drain pH

The drain pH of the biofilter unit correlated with both the influent hydrogen sulfide concentration and the amount of water contacting the media. If an increase in the influent concentration of hydrogen sulfide was observed, drain pH tended to drop. If a decrease in hydrogen sulfide concentration was observed, the pH would rise.

It is important to note that the pH will naturally fluctuate based on the incoming hydrogen sulfide. Therefore, depending on the time of day and any other factors that affect wet-well hydrogen sulfide concentrations, a surveyor may get results varied by 0.1 or even 0.2 from visit to visit, even when no operating parameters have changed.

Pressure Drop

After 9 months of operation, the pressure drop across the vessel operating at design air flow of 600 cfm (1,019 $m^3$/h) is 2.3 iwc. That, along with failure to observe changes in the media or bed height, indicates that the foamed glass media has been stable for nine months and does not readily decompose in the conditions within the operating biofilter.

Hydrogen Sulfide Removal Rate

Low hydrogen sulfide removal rates correlated directly to uneven distribution of water and nutrient across the media bed, low nutrient levels in the drain, out of range drain water pH, and low influent hydrogen sulfide concentrations.

Additionally, hydrogen sulfide removal rate may be low when influent hydrogen sulfide concentration is very high above design or has very high peak (maximum) concentrations. The bacteria in these units are limited as to the quantity of hydrogen sulfide they can consume. For the Whisper® 72 biofilter utilized in this test, was designed for operation with 100 ppmv $H_2S$ at 600 cfm. If there are extremely high peaks in hydrogen sulfide concentration, the bacteria cannot perform to the required capacity. Increases in concentration of hydrogen sulfide over a short period of time will result in lowered efficiency of the biofilter, but the biology can acclimate and achieve 99% removal within 24 hours from an immediate jump in concentration to 200 ppmv, twice the design concentration. Lower concentrations are more difficult to achieve 99% removal since the effluent concentrations required are so low.

Example 2A, 2B Conclusions

Foamed glass media exhibits high rates of $H_2S$ removal from contaminated air, and thus has potential for use as a biofilter media having superior properties, for example, lower density, longer service life, and higher $H_2S$ removal efficiency than traditional filter media.

Foamed glass media is stable and does not readily break down in a biofilter. Extrapolating from nine months data, media change-out should not be required for at least five years.

Example 3

Biofilter Acclimation Study

Testing was performed to evaluate removal of hydrogen sulfide from gaseous effluent from a lift station wet-well located in southwest Florida using a Whisper® 96 biofilter with recycled foamed glass media. The Whisper® 96 biofilter has a diameter: 96 inches (2.44 m), a total bed depth of 57 inches (1.45 m), a cross-sectional area of 50.3 ft² (4.67 m²), and a total bed volume of 239 ft³ (6.77 m³). Parameters of the wet well were as indicated in Table 3 below:

TABLE 3

| Well Diameter (ft) | Well Depth (ft) | Well Volume (ft³) | Avg. Sulfides in Air (ppm) |
|---|---|---|---|
| 12 | 20 | 2262 | 338 |

The Whisper® 96 biofilter system was designed to operate at an air flow from 0 to 280 cfm (0 to 476 m³/h), and under average $H_2S$ loadings of 300-500 ppm. Foamed glass media made from recycled glass was implemented in both the upper and lower beds of the biofilter to serve as growth sites for the sulfide oxidizing bacteria.

The biofilter system was sized to exchange air in the wet well six times per hour. It was predicted that the highly porous recycled foamed glass media would provide adequate bacterial growth to reduce sulfides discharged in air to <1 ppm, or achieve a 99% percent sulfide removal (whichever discharge value was greater).

The Biofilter was installed on May 31st and started-up Apr. 1, 2015. Surveys of the system were performed over several weeks following the start-up of the Whisper® 96 biofilter unit. Data from these surveys are provided below in Table 4 below:

TABLE 4

| Date | Days after Start-up | Inlet $H_2S$ Concentration (ppm) | Outlet $H_2S$ Concentration (ppm) | Percent Sulfide Removal |
|---|---|---|---|---|
| Apr. 3, 2015 | 2 | 70 | 60 | 14.3% |
| Apr. 15, 2015 | 14 | 90 | 30 | 66.7% |
| Apr. 24, 2015 | 23 | 90 | 0.7 | 99.2% |
| Apr. 29, 2015 | 28 | 40 | 0.2 | 99.5% |

Discussion

Acclimation

Figure 15:
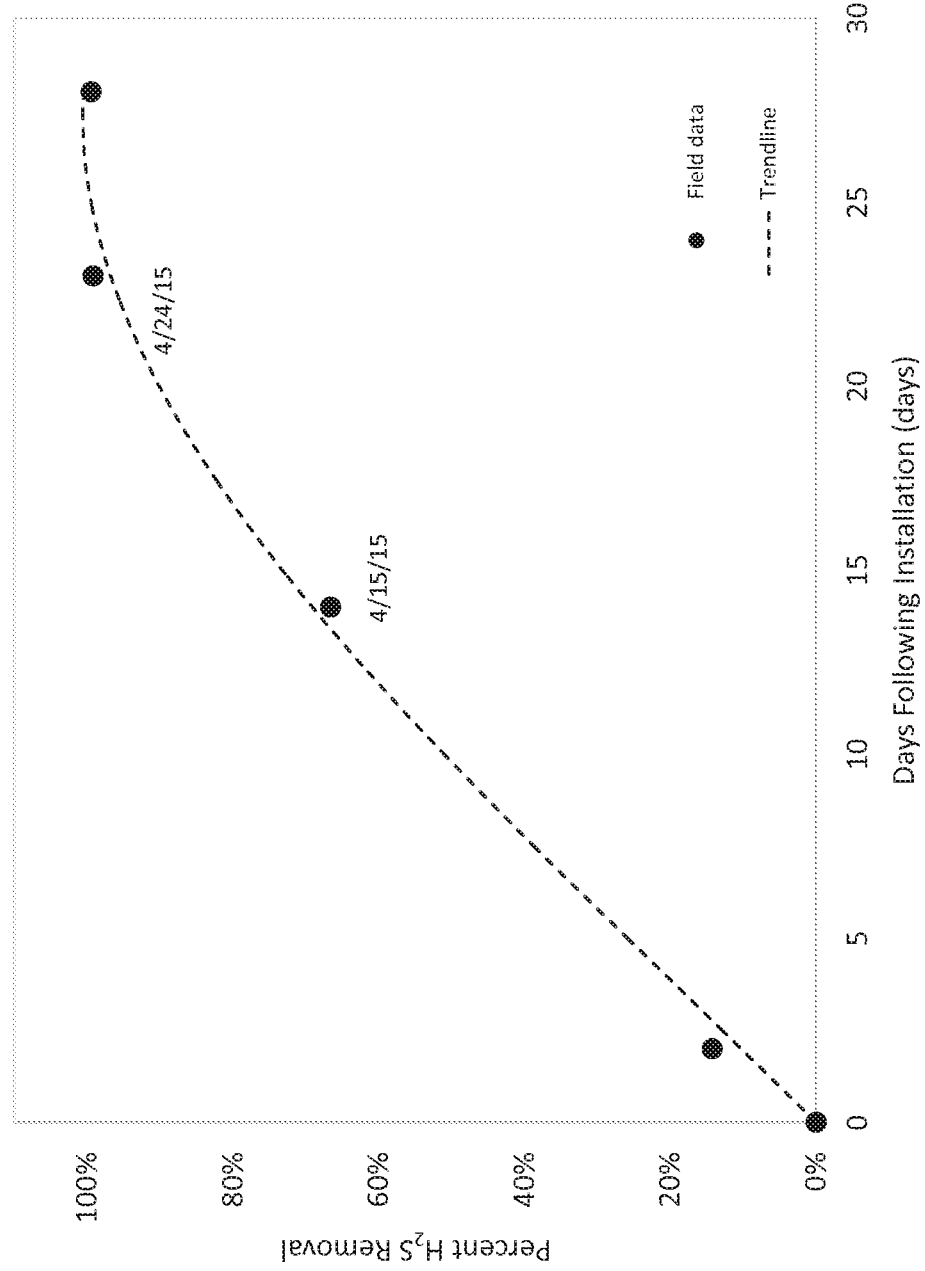
FIG. 15 is another chart of data obtained during testing of another embodiment of a biofilter including foamed glass biofilter media as disclosed herein.

It can be seen that following a few days of start-up, the system quickly responded to sulfide in air pulled from the wet-well, and began to remove $H_2S$. By the end of the third week, the target goal of 99% removal was achieved and the system was fully acclimated. FIG. 15 shows the acclimation response of the system using the data recorded above.

Sulfide Removal

With the system optimized, hydrogen sulfide concentrations from the lift station wet well and in the biofilter were as indicated in Table 5 below. It should be noted that the majority of the sulfide is removed by the first bed. This indicates high levels of bacterial activity in the lower portion of the unit.

TABLE 5

| | Gastec Sulfide Measurements | | | |
|---|---|---|---|---|
| | From Well | Inlet | Middle | Outlet |
| $H_2S$ Concentration (ppm) | 120 ppm | 41 ppm | 7 ppm | 0.2 ppm |
| Percent Removal (%) | 0% | 0% | 82.9% | 99.5% |

Nutrient

Residual nitrate in the drain water from the biofilter was observed to be approximately 0 ppm. This nitrate residual is low, and nutrient feed should be adjusted to have a residual of −5 ppm.

Drain pH

The pH of the drain water was 2.17 (optimum range 1.8-2.2), with a temperature of 25.9° C.

Pressure Drop

Pressure drop of 1.20 iwc across the blower was measured using an Extech digital manometer, which was well within an acceptable range.

Conclusions

The results of this study show that foamed glass media may be effectively used in a biofilter to remove hydrogen sulfide from contaminated air. The bacterial population on the foamed glass media acclimates quickly, and upon acclimation is capable of removing more than 99% of hydrogen sulfide from contaminated air passed through the media.

Having thus described several aspects of at least one embodiment of this invention, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. A gas phase biofilter for the treatment of contaminated air, the biofilter comprising:
    a contaminated air inlet;
    a treated air outlet; and
    a media bed including foamed glass media in fluid communication between the contaminated air inlet and the treated air outlet, the foamed glass media having a density of about 0.2 grams/cm³.

2. The biofilter of claim 1, wherein the foamed glass media comprises silicon dioxide.

3. The biofilter of claim 2, wherein the foamed glass media includes surface pores.

4. The biofilter of claim 3, wherein the foamed glass media includes internal voids.

5. The biofilter of claim 4, wherein individual pieces of the foamed glass media include passageways extending from first surfaces of the individual pieces to second surfaces of the individual pieces.

6. The biofilter of claim 1, wherein the foamed glass media comprises recycled glass.

7. The biofilter of claim 1, further comprising a population of hydrogen sulfide oxidizing bacteria disposed on the foamed glass media.

8. The biofilter of claim 7, operable to reduce a concentration of hydrogen sulfide in contaminated air including greater than 100 ppm hydrogen sulfide by more than about 95% when the contaminated air is passed through the media bed of the biofilter at a flow rate of from zero to 500 cubic meters per hour per cubic meter of media bed volume.

9. The biofilter of claim 7, operable to reduce the concentration of hydrogen sulfide in the contaminated air including greater than 100 ppm hydrogen sulfide by more than about 95% when the contaminated air is passed through the media bed of the biofilter at a flow rate of greater than about 500 cubic meters per hour per cubic meter of media bed volume.

10. The biofilter of claim 8, operable to reduce the concentration of hydrogen sulfide in the contaminated air by more than about 99% when the contaminated air is passed through the media bed of the biofilter at a flow rate of from zero to 500 cubic meters per hour per cubic meter of media bed volume.

11. The biofilter of claim 9, operable to reduce the concentration of hydrogen sulfide in the contaminated air by more than about 99% when the contaminated air is passed through the media bed of the biofilter at a flow rate of greater than about 500 cubic meters per hour per cubic meter of media bed volume.

12. A method of removing an undesirable compound from contaminated air, the method comprising flowing the contaminated air through a gas phase biofilter including a foamed glass media, the foamed glass media having a density of about 0.2 grams/cm$^3$.

13. The method of claim 12, further comprising at least partially filling a media bed compartment of the biofilter with the foamed glass media prior to flowing the contaminated air through the biofilter.

14. The method of claim 13, further comprising facilitating growth of a population of hydrogen sulfide oxidizing bacteria on the foamed glass media.

15. The method of claim 14, further comprising maintaining the population of hydrogen sulfide oxidizing bacteria on the foamed glass media.

16. The method of claim 14, further comprising:
measuring a concentration of nutrient in one of a fluid within and exiting the biofilter; and
adjusting an amount of nutrient added to the media bed compartment per unit of time responsive to the concentration of the nutrient in the fluid being outside of a predetermined range.

17. The method of claim 12, wherein removing the undesirable compound from the contaminated air comprises removing hydrogen sulfide from the contaminated air.

18. The method of claim 17, wherein removing the hydrogen sulfide from the contaminated air comprises reducing a concentration of hydrogen sulfide by passing the contaminated air at a flow rate of from about zero to about 250 cubic meters per hour per cubic meter of a media bed of the biofilter including the foamed glass media through the media bed.

19. The method of claim 18, wherein reducing the concentration of hydrogen sulfide in the contaminated air comprises reducing the concentration of hydrogen sulfide in the contaminated air by more than about 99%.

20. The method of claim 17, wherein removing the hydrogen sulfide from the contaminated air comprises reducing a concentration of hydrogen sulfide by passing the contaminated air at a flow rate of greater than about 500 cubic meters per hour per cubic meter of the media bed through the media bed.

* * * * *